United States Patent
Toya

(10) Patent No.: US 9,960,611 B2
(45) Date of Patent: May 1, 2018

(54) POWER STORAGE SYSTEM AND POWER STORAGE SYSTEM CONTROL METHOD

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 95 days.

(21) Appl. No.: 15/277,976

(22) Filed: Sep. 27, 2016

(65) Prior Publication Data
US 2017/0117721 A1    Apr. 27, 2017

(30) Foreign Application Priority Data
Oct. 22, 2015    (JP) .................................. 2015-208350

(51) Int. Cl.
*H02J 7/00*    (2006.01)

(52) U.S. Cl.
CPC .......... *H02J 7/0021* (2013.01); *H02J 7/0016* (2013.01); *H02J 7/0014* (2013.01)

(58) Field of Classification Search
CPC .... H02J 7/04; H02J 7/07; H02J 7/0013; H02J 7/0014; H02J 7/0016; H02J 7/0021; B60L 11/1864; B60L 11/1861; B60L 11/1866

USPC .................................................. 320/116, 118
See application file for complete search history.

(56) References Cited

U.S. PATENT DOCUMENTS

2017/0317508 A1*  11/2017  Owen ................... H02J 7/0021

FOREIGN PATENT DOCUMENTS

JP    2014-096918    5/2014

* cited by examiner

*Primary Examiner* — Paul Dinh
(74) *Attorney, Agent, or Firm* — Greenblum & Bernstein, P.L.C.

(57) ABSTRACT

A system includes a first circuit in which storage battery units are connected in series, second circuits, adjusters that adjust the amounts of the currents flowing through the second circuits, and a controller that performs at least one of first control and second control. The first control is control in which the controller causes the adjusters to make the voltage of a first storage battery unit higher than the voltage of a second storage battery unit having a higher degree of degradation than the first storage battery unit by adjusting the amounts of the currents flowing through the second circuits and then stops a charge. The second control is control in which the controller causes the adjusters to make the voltage of the first storage battery unit lower than the voltage of the second storage battery unit by adjusting the amounts of the currents flowing through the second circuits and then stops a discharge.

17 Claims, 22 Drawing Sheets

POWER STORAGE SYSTEM AND POWER STORAGE SYSTEM CONTROL METHOD

BACKGROUND

1. Technical Field

The present disclosure relates to a power storage system that controls multiple storage battery units, and the like.

2. Description of the Related Art

Among technologies relating to a power storage system that controls multiple storage battery units is a technology disclosed in Japanese Unexamined Patent Application Publication No. 2014-096918. A controller disclosed in Japanese Unexamined Patent Application Publication No. 2014-096918 performs cell balancing or module balancing.

SUMMARY

However, cell balancing or module balancing may not be appropriate for controlling multiple storage battery units.

One non-limiting and exemplary embodiment provides a power storage system that can appropriately control storage battery units, and the like.

In one general aspect, the techniques disclosed here feature a system including a first circuit in which storage battery units are connected in series, second circuits connected in parallel with the storage battery units, adjusters that adjust the amounts of currents flowing through the second circuits, and a controller that performs at least one of first control and second control. The first control is control in which during a charge of the storage battery units through the first circuit, the controller causes the adjusters to make a voltage of a first storage battery unit of the storage battery units higher than a voltage of a second storage battery unit of the storage battery units by adjusting the amounts of the currents flowing through the second circuits, the second storage battery unit having a higher degree of degradation than the degree of degradation of the first storage battery unit, and then stops the charge. The second control is control in which during a discharge of the storage battery units through the first circuit, the controller causes the adjusters to make the voltage of the first storage battery unit lower than the voltage of the second storage battery unit by adjusting the amounts of the currents flowing through the second circuits, and then stops the discharge.

It should be noted that general or specific embodiments may be implemented as a system, a method, an integrated circuit, a computer program, a storage medium, or any selective combination thereof.

The power storage system according to the one aspect of the present disclosure and the like appropriately control multiple storage battery units.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
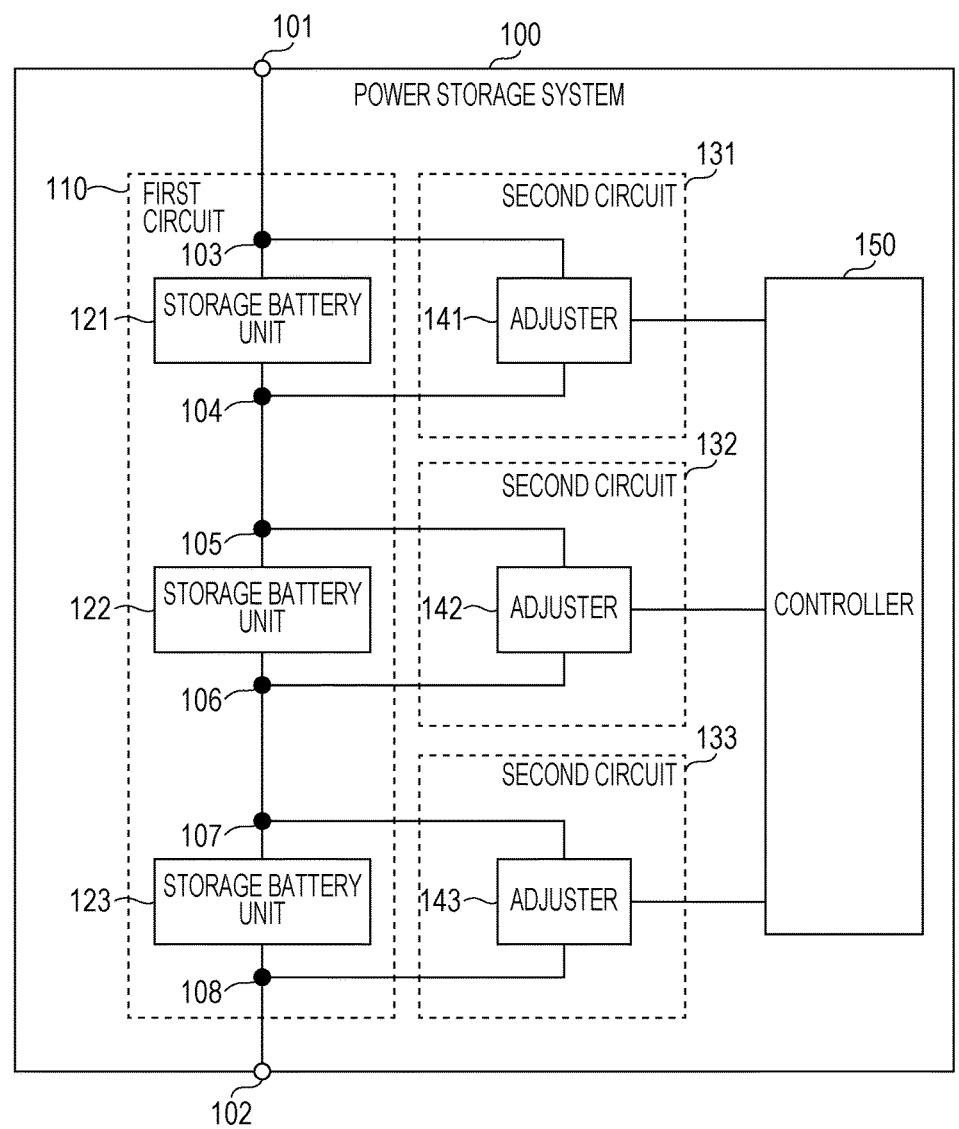
FIG. 1 is a block diagram showing the configuration of a power storage system of a first embodiment.

Underlying Knowledge Forming Basis of the Present Disclosure

The present inventors found problems associated with a power storage system that controls multiple storage battery units. The problems will be described below specifically.

There has been proposed in recent years a technology that charges and discharges multiple storage battery units connected in series while equalizing the remaining capacities of the storage battery units and thus equalizes the loads on the storage battery units. This technology is called cell balancing or module balancing. Owing to this technology, the capacities of the storage battery units connected in series are effectively used when charging and discharging them. Also, it is expected that the equalization of the loads will suppress the local degradation of the storage battery units.

However, the equalization of the loads does not necessarily suppress the local degradation. For example, some of the storage battery units may easily degrade due to the connection form, layout, or the like of the storage battery units. In this case, the storage battery units may degrade locally even when charged or discharged equally.

For this reason, even the cell balancing or module balancing technology may not have the effect of extending the life of multiple storage battery units.

In view of the foregoing, a system of a first aspect of the present disclosure includes a first circuit in which storage battery units are connected in series, second circuits connected in parallel with the storage battery units, adjusters that adjust the amounts of currents flowing through the second circuits, and a controller that performs at least one of first control and second control. If the controller performs the first control and the second control, the controller performs the first control and the second control in different times. For example, the controller performs the first control before or after the second control. The first control is control in which during a charge of the storage battery units through the first circuit, the controller causes the adjusters to make a voltage of a first storage battery unit of the storage battery units higher than a voltage of a second storage battery unit of the storage battery units by adjusting the amounts of the currents flowing through the second circuits, the second storage battery unit having a higher degree of degradation than the degree of degradation of the first storage battery unit, and then stops the charge. The second control is control in which during a discharge of the storage battery units through the first circuit, the controller causes the adjusters to make the voltage of the first storage battery unit lower than the voltage of the second storage battery unit by adjusting the amounts of the currents flowing through the second circuits, and then stops the discharge.

Thus, the degradation of the storage battery unit having the higher degree of degradation is suppressed compared to the storage battery unit having the lower degree of degradation. As a result, the system can suppress the local degradation of the storage battery units and can extend the life of the entire storage battery units. That is, the system can appropriately control the storage battery units. The storage battery units may be any of unit cells, battery blocks including multiple unit cells, and battery modules including multiple battery blocks.

A system of a second aspect of the present disclosure may be the following: in the system of the first aspect, for example, the second circuits are circuits through which currents bypassing the storage battery units flow during the charge of the storage battery units through the first circuit, and in the first control, the controller causes the adjusters to make the voltage of the first storage battery unit higher than the voltage of the second storage battery unit by making the current flowing through the second circuit connected in parallel with the first storage battery unit smaller than the current flowing through the second circuit connected in parallel with the second storage battery unit, and then stops the charge.

This results in the suppression of the charge of the storage battery unit having the higher degree of degradation and thus the suppression of the degradation of this storage battery unit, thereby suppressing local degradation.

A system of a third aspect of the present disclosure may be the following: in the system of the first aspect, for example, the second circuits are circuits through which discharge currents of the storage battery units flow during the charge of the storage battery units through the first circuit, and in the first control, the controller causes the adjusters to make the voltage of the first storage battery unit higher than the voltage of the second storage battery unit by making the current flowing through the second circuit disposed in parallel with the first storage battery unit smaller than the current flowing through the second circuit disposed in parallel with the second storage battery unit, and then stops the charge.

Thus, the storage battery unit having the higher degree of degradation is controlled so that it is not fully charged, and the degradation thereof is suppressed. As a result, local degradation is suppressed.

A system of a fourth aspect of the present disclosure may be the following: in the system of the third aspect, for example, at least either before starting the charge of the storage battery units through the first circuit or during a suspension of the charge, the controller causes the adjusters to make the voltage of the first storage battery unit higher than the voltage of the second storage battery unit by making the current flowing through the second circuit connected in parallel with the first storage battery unit lower than the current flowing through the second circuit connected in parallel with the second storage battery unit.

Thus, a discharge is performed at an appropriate timing, and the storage battery unit having the higher degree of degradation is controlled so that it is not fully charged.

A system of a fifth aspect of the present disclosure may be the following: in the power storage system of the first aspect, for example, the second circuits are circuits through which currents bypassing the storage battery units flow during the discharge of the storage battery units through the first circuit, and in the second control, the controller causes the adjusters to make the voltage of the first storage battery unit lower than the voltage of the second storage battery unit by making the current flowing through the second circuit disposed in parallel with the first storage battery unit smaller than the current flowing through the second circuit disposed in parallel with the second storage battery unit, and then stops the discharge.

This results in the suppression of the discharge of the storage battery unit having the higher degree of degradation and thus the suppression of the degradation thereof, thereby suppressing local degradation.

A system of a sixth aspect of the present disclosure may be the following: in the system of the first aspect, for example, the second circuits are circuits through which discharge currents of the storage battery units flow during the discharge of the storage battery units through the first circuit, and in the second control, the controller causes the adjusters to make the voltage of the first storage battery unit lower than the voltage of the second storage battery unit by making the current flowing through the second circuit connected in parallel with the first storage battery unit greater than the current flowing through the second circuit connected in parallel with the second storage battery unit, and then stops the discharge.

Thus, the storage battery unit having the higher degree of degradation is controlled so that it is not emptied first, and the degradation thereof is suppressed. As a result, local degradation is suppressed.

A system of a seventh aspect of the present disclosure may be the following: in the power storage system of the sixth aspect, for example, at least either before starting the discharge of the storage battery units through the first circuit or during a suspension of the discharge, the controller causes the adjusters to make the voltage of the first storage battery unit higher than the voltage of the second storage battery unit by making the current flowing through the second circuit connected in parallel with the first storage battery unit greater than the current flowing through the second circuit connected in parallel with the second storage battery unit.

Thus, a discharge is performed at an appropriate timing, and the storage battery unit having the higher degree of degradation is controlled so that it is not emptied.

A system of an eighth aspect of the present disclosure may be the following: in the system of any one of the first to fourth aspects, for example, in the first control, the controller raises the voltage of the first storage battery unit to a charge end voltage, raises the voltage of the second storage battery unit to a lower voltage than the charge end voltage, and then stops the charge.

Thus, the charge of the storage battery unit having the higher degree of degradation is stopped before it is fully charged, resulting in the suppression of the degradation of this storage battery unit.

A system of a ninth aspect of the present disclosure may be the following: in the system of any one of the fifth to seventh aspects, for example, in the second control, the controller lowers the voltage of the first storage battery unit to a discharge end voltage, lowers the voltage of the second storage battery unit to a higher voltage than the discharge end voltage, and then stops the discharge.

Thus, the discharge of the storage battery unit having the higher degree of degradation is stopped before it is emptied, resulting in the suppression of the degradation of this storage battery unit.

A system of a tenth aspect of the present disclosure may be the following: in the system of any one of the first to fourth aspects, for example, during the charge of the storage battery units through the first circuit, the controller performs the charge of the storage battery units through the first circuit without performing the first control and then performs the first control.

Thus, unnecessary adjustments are suppressed during the charge, resulting in the suppression of energy loss during the charge.

A system of an eleventh aspect of the present disclosure may be the following: in the system of any one of the first, fifth to seventh, and ninth aspects, for example, during the discharge of the storage battery units through the first circuit, the controller performs the discharge of the storage battery units through the first circuit without performing the second control and then performs the second control.

Thus, unnecessary adjustments are suppressed during the discharge, resulting in the suppression of energy loss during the discharge.

A system of a twelfth aspect of the present disclosure may be the following: in the system of any one of the first to eleventh aspects, for example, the first storage battery unit is a storage battery unit having the lowest degree of degradation, of the storage battery units.

This results in the suppression of the degradation of storage battery units other than the storage battery unit having the lowest degree of degradation. That is, the degradation of storage battery units having relatively high degrees of degradation is suppressed. As a result, local degradation is suppressed. The storage battery units may be any of unit cells and battery blocks including multiple unit cells.

A system of a thirteenth aspect of the present disclosure may be the following: in the system of any one of the first to twelfth aspects, for example, the second storage battery unit is a storage battery unit having the highest degree of degradation, of the storage battery units.

Thus, the degradation of the storage battery unit having the highest degree of degradation is suppressed, resulting in the suppression of local degradation. The storage battery units may be any of unit cells and battery blocks including multiple unit cells.

A system of a fourteen aspect of the present disclosure may be the following: in the system of any one of the first to eleventh aspects, for example, the storage battery units each include storage batteries, and the first storage battery unit is a storage battery unit including a storage battery having the lowest degree of degradation in a group of respective storage batteries having the highest degree of degradation of the storage battery units.

This results in the suppression of the degradation of storage battery units different from the storage battery unit including the storage battery having the lowest of the highest degrees of degradation. In other words, the degradation of storage battery units including storage batteries having relatively high degrees of degradation, of the highest degrees of degradation is suppressed. As a result, local degradation is suppressed. The storage batteries may be any of unit cells and battery blocks including multiple unit cells.

A system of a fifteenth aspect of the present disclosure may be the following: in the system of any one of the first to eleventh and fourteenth aspects, for example, the storage battery units each include storage batteries, and the second storage battery unit is a storage battery unit including a storage battery having the highest degree of degradation in a group of respective storage batteries having the highest degree of degradation of the storage battery units.

This results in the suppression of the degradation of the storage battery unit including the storage battery having the highest of the highest degrees of degradation, thereby suppressing local degradation. The storage battery may be any of a unit cell and a battery block including multiple unit cells. The storage battery units including multiple storage batteries may be any of battery blocks and battery modules.

A system of a sixteenth aspect of the present disclosure may be the following: the system of any one of the first to fifteenth aspects, for example, further includes detectors that detect the quantities of state of the storage battery units, and the controller causes the adjusters to stop the currents flowing through the second circuits and determines the degrees of degradation of the storage battery units from the quantities of state detected by the detectors while stopping the currents flowing through the second circuits.

Thus, the quantity of state is detected appropriately without being affected by adjustment. As a result, the degree of degradation is determined appropriately.

A method according to a seventeenth aspect includes performing at least one of first control and second control. The first control includes (a) during a charge of multiple storage battery units connected in series, making a voltage of a first storage battery unit of the storage battery units higher than a voltage of a second storage battery unit of the storage battery units by adjusting the amounts of currents flowing through circuits connected in parallel with the storage battery units, the second storage battery unit having a higher degree of degradation than the degree of degradation of the first storage battery unit, and (b) then stopping the charge of the storage battery units with the voltage of the first storage battery unit higher than the voltage of the second storage battery unit. The second control includes (c) during a discharge of the storage battery units, making the voltage of the first storage battery unit lower than the voltage of the second storage battery unit by adjusting the amounts of the currents flowing through the circuits connected in parallel with the storage battery units and (d) then stopping the discharge of the storage battery units with the voltage of the first storage battery unit lower than the voltage of the second storage battery unit. If the controller performs the first control and the second control, the controller performs the first control and the second control in different times. For example, the controller performs the first control before or after the second control.

Thus, the degradation of the storage battery unit having the higher degree of degradation is suppressed compared to that of the storage battery unit having the lower degree of degradation. This results in the suppression of the local degradation of the storage battery units and the extension of the life of the entire storage battery units. That is, the storage battery units are controlled appropriately.

It should be noted that these general or specific aspects may be implemented as systems, devices, methods, integrated circuits, computer programs, non-transitory storage media such as computer-readable CD-ROM, or any combinations thereof.

Now, embodiments will be described in detail with reference to the accompanying drawings. The embodiments below represent general or specific examples. The numbers, shapes, materials, elements, the positions and connection forms of the elements, steps, the order of the steps, and the like described in the embodiments are only illustrative and are not intended to limit the present disclosure. Of the elements of the embodiments, elements which are not set forth in the independent claims representing the highest concept are described as optional elements.

For description, ordinal numbers, such as first, second, and third, may be added to the elements or the like, replaced, or removed. A charge/discharge refers to at least one of a charge and a discharge. Voltage, current, resistance, and power may refer to a voltage value indicating voltage, a current value indicating current, a resistance value indicating resistance, and a power value indicating power, respectively.

First Embodiment

FIG. 1 is a block diagram showing the configuration of a power storage system according to the present embodiment. A power storage system 100 shown in FIG. 1 controls storage battery units 121, 122, and 123. The power storage system 100 may consist of a single device or may consist of multiple devices. The power storage system 100 includes a first circuit 110, second circuits 131, 132, and 133, and a controller 150.

The first circuit 110 is an example of a first circuit of the present disclosure and is an electric circuit in which the storage battery units 121, 122, and 123 are connected in series. Specifically, the first circuit 110 corresponds to a path from a terminal 101 to a terminal 102 of the power storage system 100 through the storage battery units 121, 122, and 123. One of the terminal 101 and terminal 102 is a positive electric terminal, and the other is a negative electric terminal.

The storage battery units 121, 122, and 123 are an example of storage battery units of the present disclosure and are elements for accumulating electric energy. The storage battery units 121, 122, and 123 may be any of unit cells, battery blocks including multiple unit cells, and battery modules including multiple battery blocks. A unit cell is also called a storage battery or simply called a cell. A battery block is also called a storage battery block. In a battery block, multiple unit cells are connected at least either in series or in parallel. A battery module is also called a storage battery module, a battery pack, or a storage battery pack. In a battery module, multiple battery blocks are connected at least either in series or in parallel.

The second circuits 131, 132, and 133 are electric circuits and are an example of second circuits of the present disclosure. The second circuits 131, 132, and 133 are disposed in parallel with the storage battery units 121, 122, and 123. Specifically, the second circuit 131 is disposed in parallel with the storage battery unit 121; the second circuit 132 is disposed in parallel with the storage battery unit 122; and the second circuit 133 is disposed in parallel with the storage battery unit 123.

For example, the second circuit 131 corresponds to a path from a junction 103 through an adjuster 141 to a junction 104. The second circuit 132 corresponds to a path from a junction 105 through an adjuster 142 to a junction 106. The second circuit 133 corresponds to a path from a junction 107 through an adjuster 143 to a junction 108.

The adjusters 141, 142, and 143 adjust the amounts of currents flowing through the second circuits 131, 132, and 133, respectively. For example, the adjusters 141, 142, and 143 are electric circuits included in the second circuits 131, 132, and 133, respectively. Specifically, the adjuster 141 adjusts the amount of the current flowing through the second circuit 131; the adjuster 142 adjusts the amount of the current flowing through the second circuit 132; and the adjuster 143 adjusts the amount of the current flowing through the second circuit 133.

The adjusters 141, 142, and 143 may each include a resistor, a switch, and the like for adjusting the amount of the current. Typically, the adjusters 141, 142, and 143 adjust the amounts of the currents under the control of the controller 150.

The controller 150 controls adjustments made by the adjusters 141, 142, and 143. That is, the controller 150 adjusts the amounts of the currents flowing through the second circuits 131, 132, and 133 using the adjusters 141, 142, and 143. The controller 150 may further control the charge/discharge of the storage battery units 121, 122, and 123 connected in series.

The controller 150 only has to have a control function and may include a processing unit and a storage unit for storing a control program. The processing unit may be an MPU or CPU. The storage unit may be a volatile memory or non-volatile memory. The controller 150 may consist of a single controller that performs control centrally or may consist of multiple controllers that perform control in a distributed manner by working together.

The configuration shown in FIG. 1 is only illustrative, and the number of the storage battery units 121, 122, and 123, the number of the second circuits 131, 132, and 133, and the number of the adjusters 141, 142, and 143 may each be 2, or 4 or more. The terminals 101 and 102 and the junctions 103 to 108 may be added, changed, or removed as appropriate with a change in the configuration. For example, if the power storage system 100 generates and consumes power within itself, the terminals 101 and 102 need not be disposed.

Figure 2:
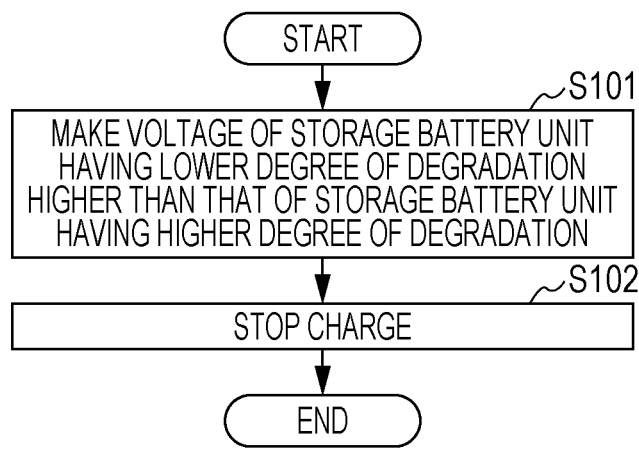
FIG. 2 is a flowchart showing the operation of the power storage system of the first embodiment of the present disclosure during a charge.

FIG. 2 is a flowchart showing the operation of the power storage system 100 shown in FIG. 1 during a charge. The operation shown in FIG. 2 is an example of first control of the present disclosure. In the description of the operation shown in FIG. 2, it is assumed that the degree of degradation of the storage battery unit 122 is higher than that of the storage battery unit 121.

During a charge of the storage battery units 121, 122, and 123, the controller 150 adjusts the amounts of the currents flowing through the second circuits 131, 132, and 133 by controlling the adjusters 141, 142, and 143. The controller 150 then makes the voltage of the storage battery unit 121 higher than that of the storage battery unit 122 having the higher degree of degradation than the storage battery unit 121 (S101). The controller 150 then stops the charge of the storage battery units 121, 122, and 123 with the voltage of the storage battery unit 121 higher than that of the storage battery unit 122 (S102).

It is conceivable that when the storage battery units 121, 122, and 123 are increased in voltage during a charge, they typically degrade. It is also conceivable that when the storage battery units 121, 122, and 123 are charged until they are increased in voltage, that is, until the capacities thereof are almost fully restored, the amount of input/output increases and thus they degrade.

For this reason, as described above, the power storage system 100 of the present embodiment makes the voltage of the storage battery unit 121 having the lower degree of degradation than that of the storage battery unit 122 having the higher degree of degradation and then stops the charge. Thus, the degradation of the storage battery unit 122 having the higher degree of degradation is suppressed compared to that of the storage battery unit 121 having the lower degree of degradation.

Thus, the power storage system 100 can suppress the local degradation of the storage battery units 121, 122, and 123 and can control the storage battery units 121, 122, and 123 appropriately.

Figure 3:
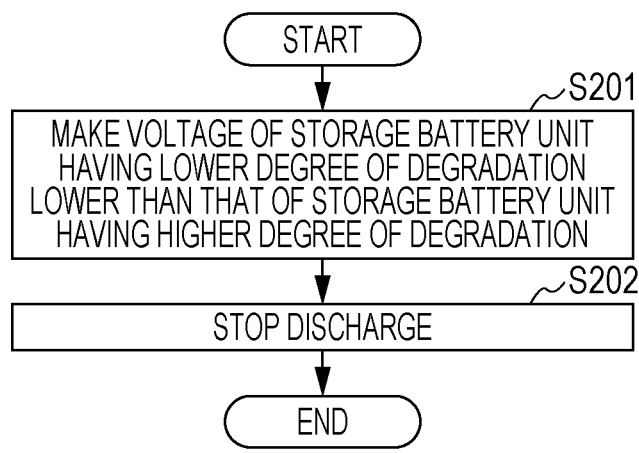
FIG. 3 is a flowchart showing the operation of the power storage system of the first embodiment during a discharge.

FIG. 3 is a flowchart showing the operation of the power storage system 100 shown in FIG. 1 during a discharge. The operation shown in FIG. 3 is an example of second control of the present disclosure. As in the description with reference to FIG. 2, in the description of the operation shown in FIG. 3, it is assumed that the degree of degradation of the storage battery unit 122 is higher than that of the storage battery unit 121.

During a discharge of the storage battery units 121, 122, and 123, the controller 150 adjusts the amounts of the currents flowing through the second circuits 131, 132, and 133 by controlling the adjusters 141, 142, and 143. The controller 150 then makes the voltage of the storage battery unit 121 lower than that of the storage battery unit 122 having the higher degree of degradation than the storage battery unit 121 (S201). The controller 150 then stops the discharge of the storage battery units 121, 122, and 123 with the voltage of the storage battery unit 121 lower than that of the storage battery unit 122 (S202).

It is conceivable that when the storage battery units 121, 122, and 123 are reduced in voltage during a discharge, they typically degrade. It is also conceivable that when the storage battery units 121, 122, and 123 are discharged until they are reduced in voltage, that is, until the remaining capacities are almost exhausted, the amount of input/output increases and thus they degrade.

For this reason, as described above, the power storage system 100 of the present embodiment makes the voltage of the storage battery unit 121 having the lower degree of degradation lower than that of the storage battery unit 122 having the higher degree of degradation and then stops the discharge. Thus, the degradation of the storage battery unit 122 having the higher degree of degradation is suppressed compared to that of the storage battery unit 121 having the lower degree of degradation.

Thus, the power storage system 100 can suppress the local degradation of the storage battery units 121, 122, and 123 and can extend the life of the entire storage battery units 121, 122, and 123. That is, the power storage system 100 can control the storage battery units 121, 122, and 123 appropriately.

The power storage system 100 may perform one of the operation shown in FIG. 2 and the operation shown in FIG. 3 or may perform both. Even when the power storage system 100 performs one of these operations, it can suppress the local degradation of the storage battery units 121, 122, and 123.

The second circuits 131, 132, and 133 may be circuits through which currents bypassing the storage battery units 121, 122, and 123 flow during the charge of the storage battery units 121, 122, and 123. In this case, the controller 150 may make the current flowing through the second circuit 131 disposed in parallel with the storage battery unit 121 having the lower degree of degradation smaller than the current flowing through the second circuit 132 disposed in parallel with the storage battery unit 122 having the higher degree of degradation.

This results in the suppression of the charge of the storage battery unit 122 having the higher degree of degradation and thus the suppression of the degradation thereof, thereby suppressing local degradation.

The second circuits 131, 132, and 133 may be circuits through which the discharge currents of the storage battery units 121, 122, and 123 flow during a charge of the storage battery units 121, 122, and 123. In this case, the controller 150 may make the current flowing through the second circuit 131 disposed in parallel with the storage battery unit 121 having the lower degree of degradation smaller than the current flowing through the second circuit 132 disposed in parallel with the storage battery unit 122 having the higher degree of degradation.

Thus, the storage battery unit 122 having the higher degree of degradation is controlled so that it is not fully charged, and the degradation thereof is suppressed. As a result, local degradation is suppressed.

The controller 150 may also make the discharge current flowing through the second circuit 131 smaller than the discharge current flowing through the second circuit 132 at least either before starting a charge of the storage battery units 121, 122, and 123 or during a suspension of the charge. Thus, a discharge is performed at an appropriate timing, and the storage battery unit 122 having the higher degree of degradation is controlled so that it is not fully charged.

The second circuits 131, 132, and 133 may also be circuits through which currents bypassing the storage battery units 121, 122, and 123 flow during a discharge of the storage battery units 121, 122, and 123. In this case, the controller 150 may make the current flowing through the second circuit 131 disposed in parallel with the storage battery unit 121 having the lower degree of degradation smaller than the current flowing through the second circuit 132 disposed in parallel with the storage battery unit 122 having the higher degree of degradation.

This results in the suppression of the discharge of the storage battery unit 122 having the higher degree of degradation and thus the suppression of the degradation thereof, thereby suppressing local degradation.

The second circuits 131, 132, and 133 may also be circuits through which the discharge current of the storage battery units 121, 122, and 123 flows during a discharge of the storage battery units 121, 122, and 123. In this case, the controller 150 may make the current flowing through the second circuit 131 disposed in parallel with the storage battery unit 121 having the lower degree of degradation greater than the current flowing through the second circuit 132 disposed in parallel with the storage battery unit 122 having the higher degree of degradation.

Thus, the storage battery unit 122 having the higher degree of degradation is controlled so that it is not emptied first, and the degradation thereof is suppressed. As a result, local degradation is suppressed.

The controller 150 may also make the discharge current flowing through the second circuit 131 greater than the discharge current flowing through the second circuit 132 at least either before starting a discharge of the storage battery units 121, 122, and 123 or during a suspension of the discharge. Thus, a discharge is performed at an appropriate timing, and the storage battery unit 122 having the higher degree of degradation is controlled so that it is not emptied.

The controller 150 may define the voltage of the storage battery unit 121 having the lower degree of degradation as a charge end voltage, set the voltage of the storage battery unit 122 having the higher degree of degradation to a lower voltage than the charge end voltage, and stop the charge. Thus, the charge is stopped before the storage battery unit 122 having the higher degree of degradation is fully charged, resulting in the suppression of the degradation of this storage battery unit.

The controller 150 may define the voltage of the storage battery unit 121 having the lower degree of degradation as a discharge end voltage, set the voltage of the storage battery unit 122 having the higher degree of degradation to a higher voltage than the discharge end voltage, and stop the discharge. Thus, the discharge is stopped before the storage battery unit 122 having the higher degree of degradation is emptied, resulting in the suppression of the degradation of this storage battery unit.

During a charge of the storage battery units 121, 122, and 123, the controller 150 may charge the storage battery units 121, 122, and 123 without the controlling the adjusters 141, 142, and 143 and then control the adjusters 141, 142, and 143. Thus, unnecessary adjustments are suppressed during the charge, resulting in the suppression of energy loss during the charge.

During a discharge of the storage battery units 121, 122, and 123, the controller 150 may discharge the storage battery units 121, 122, and 123 without controlling the adjusters 141, 142, and 143 and then control the adjusters 141, 142, and 143. Thus, unnecessary adjustments are suppressed during the discharge, resulting in the suppression of energy loss during the discharge.

The storage battery unit 121 having the lower degree of degradation may be a storage battery unit having the lowest degree of degradation, of the storage battery units 121, 122, and 123. The storage battery unit 122 having the higher degree of degradation may be a storage battery unit having the highest degree of degradation, of the storage battery units 121, 122, and 123.

The storage battery units 121, 122, and 123 may each include multiple storage batteries. The storage battery unit 121 having the lower degree of degradation may be a storage battery unit including a storage battery having the lowest degree of degradation in a group consisting of the respective storage batteries having the highest degree of degradation of the storage battery units 121, 122, and 123. The storage battery unit 122 having the higher degree of degradation may be a storage battery unit including a storage battery having the highest degree of degradation in a group consisting of the respective storage batteries having the highest degree of degradation of the storage battery units 121, 122, and 123.

The power storage system 100 may further include detectors that detect the quantities of state of the storage battery units 121, 122, and 123. In this case, for example, the controller 150 stops the currents flowing through the second circuits 131, 132, and 133 by controlling the adjusters 141, 142, and 143 and determines the degrees of degradation of the storage battery units 121, 122, and 123 from the quantities of state detected by the detectors while stopping the currents flowing through the second circuits 131, 132, and 133.

Thus, the quantities of state are detected appropriately without being affected by adjustments. As a result, the degrees of degradation are determined appropriately.

Second Embodiment

The present embodiment corresponds to a specific example of the first embodiment. Some of the elements and/or operations described in the present embodiment may be combined with those described in the first embodiment.

Figure 4:
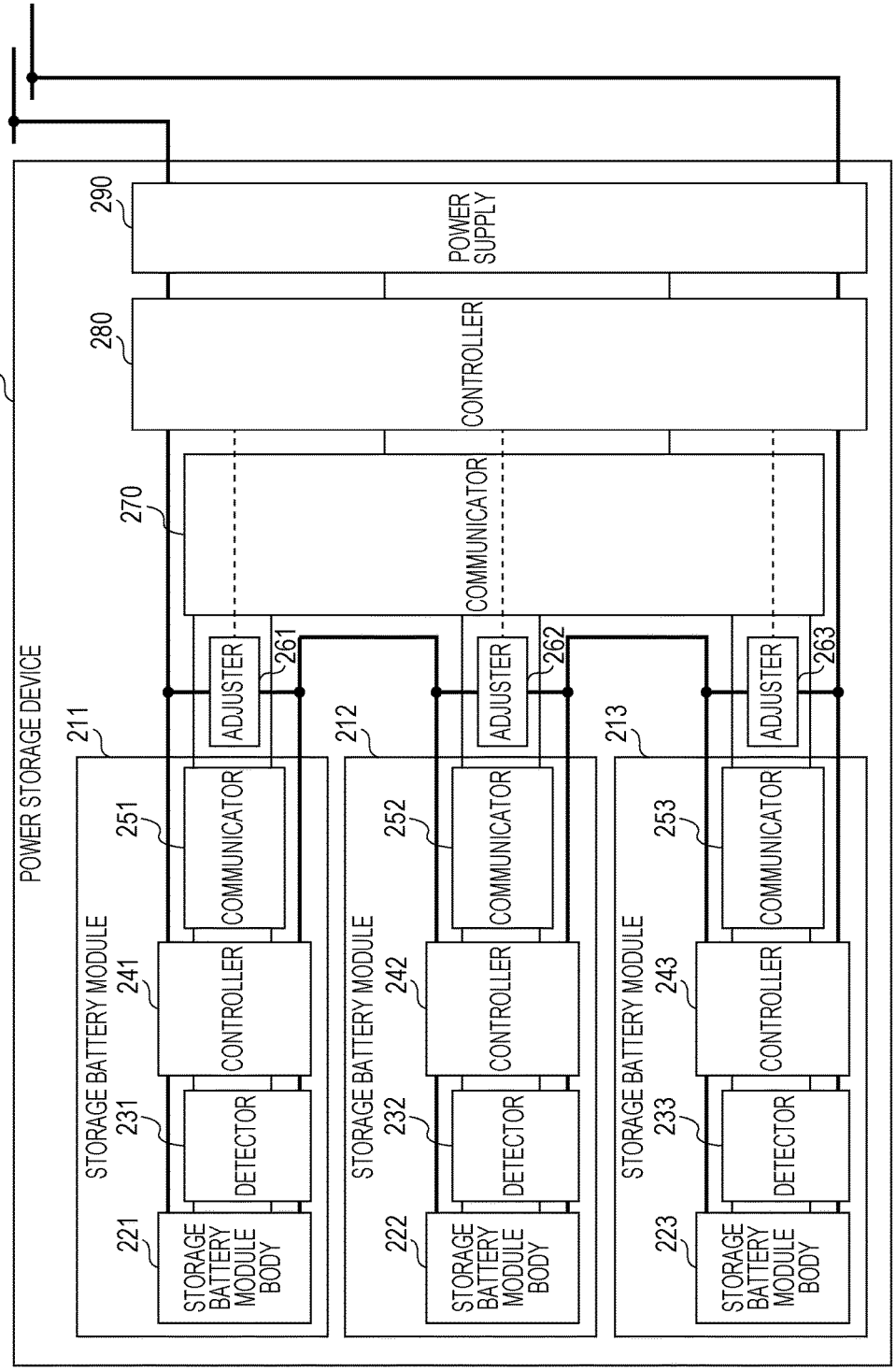
FIG. 4 is a block diagram showing the configuration of a power storage device of a second embodiment.

FIG. 4 is a block diagram showing the configuration of a power storage device 200 according to the present embodiment. In FIG. 4, thick lines represent paths for transferring power, and thin and dotted lines represent paths for transferring information. As shown in FIG. 4, multiple paths for transferring information may be disposed between elements. These paths may differ on the basis of the type of information or the direction in which information is transferred.

The power storage device 200 shown in FIG. 4 includes storage battery modules 211, 212, and 213, adjusters 261, 262, and 263, a communicator 270, a controller 280, and a power supply 290. Note that the storage battery modules 211, 212, and 213 may be detachable from the power storage device 200 and that the power storage device 200 need not include the storage battery modules 211, 212, and 213 as elements.

For example, the power storage device 200 corresponds to the power storage system 100 of the first embodiment. The storage battery modules 211, 212, and 213 are an example of the storage battery units 121, 122, and 123 of the first embodiment. The adjusters 261, 262, and 263 correspond to the adjusters 141, 142, and 143 of the first embodiment. The controller 280 corresponds to the controller 150 of the first embodiment.

A path passing through the storage battery modules 211, 212, and 213 corresponds to the first circuit 110 of the first embodiment. A path passing through the adjuster 261, a path passing through the adjuster 262, and a path passing through the adjuster 263 correspond to the second circuits 131, 132, and 133, respectively, of the first embodiment.

The storage battery module 211 includes a storage battery module body 221, a detector 231, a controller 241, and a communicator 251. The storage battery module 211 is also called a battery module, a battery pack, or a storage battery pack.

The storage battery module body 221 is an element for accumulating electric energy and typically includes multiple storage battery blocks. A storage battery block is also called a battery block.

The detector 231 detects the quantity of state of the storage battery module body 221. For example, the detector 231 detects the charge voltage, discharge voltage, internal resistance, or the like of the storage battery module body 221. The detector 231 may detect the charge voltages, discharge voltages, internal resistances, or the like of multiple storage battery blocks of the storage battery module body 221. Specifically, the detector 231 may be a voltmeter or may be an ammeter.

As used herein, the charge voltage refers to the voltage of power charged into a storage battery module body, and the discharge voltage refers to the voltage of power discharged from a storage battery module body. Note that the charge voltage of a storage battery of the storage battery module body 221 may be simply referred to as the charge voltage of the storage battery module body 221 or the charge voltage of the storage battery module 211. Similarly, the discharge voltage of a storage battery of the storage battery module body 221 may be simply referred to as the discharge voltage of the storage battery module body 221 or the discharge voltage of the storage battery module 211.

The controller 241 controls the entire operation of the storage battery module 211. For example, the controller 241 may include a converter for controlling the charge or discharge of the storage battery module body 221. The controller 241 may acquire the quantity of state detected by the detector 231 and report it to the controller 280 through the communicators 251 and 270.

The controller 241 only has to have a control function and may include a processing unit and a storage unit for storing a control program. The processing unit may be an MPU or CPU. The storage unit may be a volatile memory or non-volatile memory. The controller 241 may consist of a single controller that performs control centrally or may consist of multiple controllers that perform control in a distributed manner by working together.

The communicator 251 is an element through which the storage battery module 211 performs communication. The communicator 251 may include a communication interface. The communicator 251 is typically used when the controller 241 of the storage battery module 211 communicates with the controller 280 of the power storage device 200. Specifically, the communicator 251 communicates with the communicator 270 of the power storage device 200.

The storage battery module 212 includes a storage battery module body 222, a detector 232, a controller 242, and a communicator 252. The storage battery module 213 includes a storage battery module body 223, a detector 233, a controller 243, and a communicator 253. While the storage battery modules 212 and 213 and the elements thereof are equivalent to the storage battery module 211 and the elements thereof, the degree of degradation varies among the storage battery modules 211, 212, and 213 due to the use situation or the like. As with the controller 241, the controllers 242 and 243 only have to have a control function and may each include a processing unit and a storage unit for storing a control program. The processing unit may be an MPU or CPU. The storage unit may be a volatile memory or non-volatile memory. The controllers 242 and 243 may each consist of a single controller that performs control centrally or may each consist of multiple controllers that perform control in a distributed manner by working together.

The degree of degradation refers to the degree to which a storage battery module has degraded. Specifically, as a storage battery module degrades, the degree of degradation thereof increases. The degrees of degradation of the storage battery modules 211, 212, and 213 correspond to the degrees of degradation of the storage battery module bodies 221, 222, 223.

More specifically, the degree of degradation of the storage battery module 211 corresponds to the degree of degradation of a most highly degraded storage battery block of multiple storage battery blocks included in the storage battery module body 221. Similarly, the degree of degradation of the storage battery module 212 corresponds to the degree of degradation of a most highly degraded storage battery block of multiple storage battery blocks included in the storage battery module body 222. Similarly, the degree of degradation of the storage battery module 213 corresponds to the degree of degradation of a most highly degraded storage battery block of multiple storage battery blocks included in the storage battery module body 223.

For example, a most highly degraded storage battery module of the storage battery modules 211, 212, and 213 includes a storage battery block having the highest degree of degradation in a group consisting of the respective storage battery blocks having the highest degree of degradation of the storage battery modules 211, 212, and 213. A storage battery module having the lowest degree of degradation, of the storage battery modules 211, 212, and 213 includes a storage battery block having the lowest degree of degradation in a group consisting of the respective storage battery blocks having the highest degree of degradation of the storage battery modules 211, 212, and 213.

The adjuster 261 adjusts the amount of the current flowing through the adjuster 261. The adjuster 261 may include a resistor, a switch, and the like for adjusting the amount of current. The adjuster 261 adjusts the amount of the current under the control of the controller 280. The adjusters 262 and 263 are elements equivalent to the adjuster 261.

The communicator 270 is an element through which the power storage device 200 performs communication. The communicator 270 may include a communication interface. The communicator 270 is typically used when the controller 280 of the power storage device 200 communicates with the controllers 241, 242, and 243 of the storage battery modules 211, 212, and 213. Specifically, the communicator 270 communicates with the communicators 251, 252, and 253 of the storage battery modules 211, 212, and 213.

The controller 280 controls the entire operation of the power storage device 200. For example, the controller 280 controls adjustments made by the adjusters 261, 262, and 263. The controller 280 adjusts the amounts of the currents flowing through the adjusters 261, 262, and 263 by controlling adjustments made by the adjusters 261, 262, and 263. The controller 280 may control the charge/discharge of the storage battery modules 211, 212, and 213 connected in series or may control the input/output of the power supply 290.

The controller 280 may include a processing unit and a storage unit. The processing unit may be an MPU or CPU. The storage unit may be a volatile memory or non-volatile memory. The controller 280 may consist of a single controller that performs control centrally or may consist of multiple controllers that perform control in a distributed manner by working together.

The power supply 290 is an element for supplying power. The power supply 290 receives power to be charged into the power storage device 200 from a system power line and transmits power discharged from the power storage device 200 to the system power line. The power supply 290 ma include a bi-directional inverter that converts direct-current power conforming to the storage battery modules 211, 212, and 213 into alternating-current power conforming to the system power line and converts alternating-current power conforming to the system power line into direct current conforming to the storage battery modules 211, 212, and 213.

As described above, the power storage device 200 includes the adjusters 261, 262, and 263, which are disposed in parallel with the storage battery modules 211, 212, and 213. The amounts of the currents flowing through the adjusters 261, 262, and 263 vary with the degrees of degradation of the storage battery modules 211, 212, and 213, respectively.

Specifically, the controller 280 acquires the quantities of state detected by the detectors 231, 232, and 233 through the controllers 241, 242, and 243 and the communicators 251, 252, 253, and 270 and determines the degrees of degradation on the basis of the quantities of state. For example, the controller 280 may acquire the internal resistances as the quantities of state and determine the degrees of degradation in such a manner that the degree of degradation is increased as the internal resistance is increased.

The controller 280 adjusts the amounts of the currents flowing through the adjusters 261, 262, and 263 so that a storage battery module having a lower degree of degradation, of the storage battery modules 211, 212, and 213 is charged or discharged to a higher degree.

The configuration shown in FIG. 4 is only illustrative, and the number of the storage battery modules 211, 212, and 213 and the number of the adjusters 261, 262, and 263 may be two, or four or more.

Figure 5:
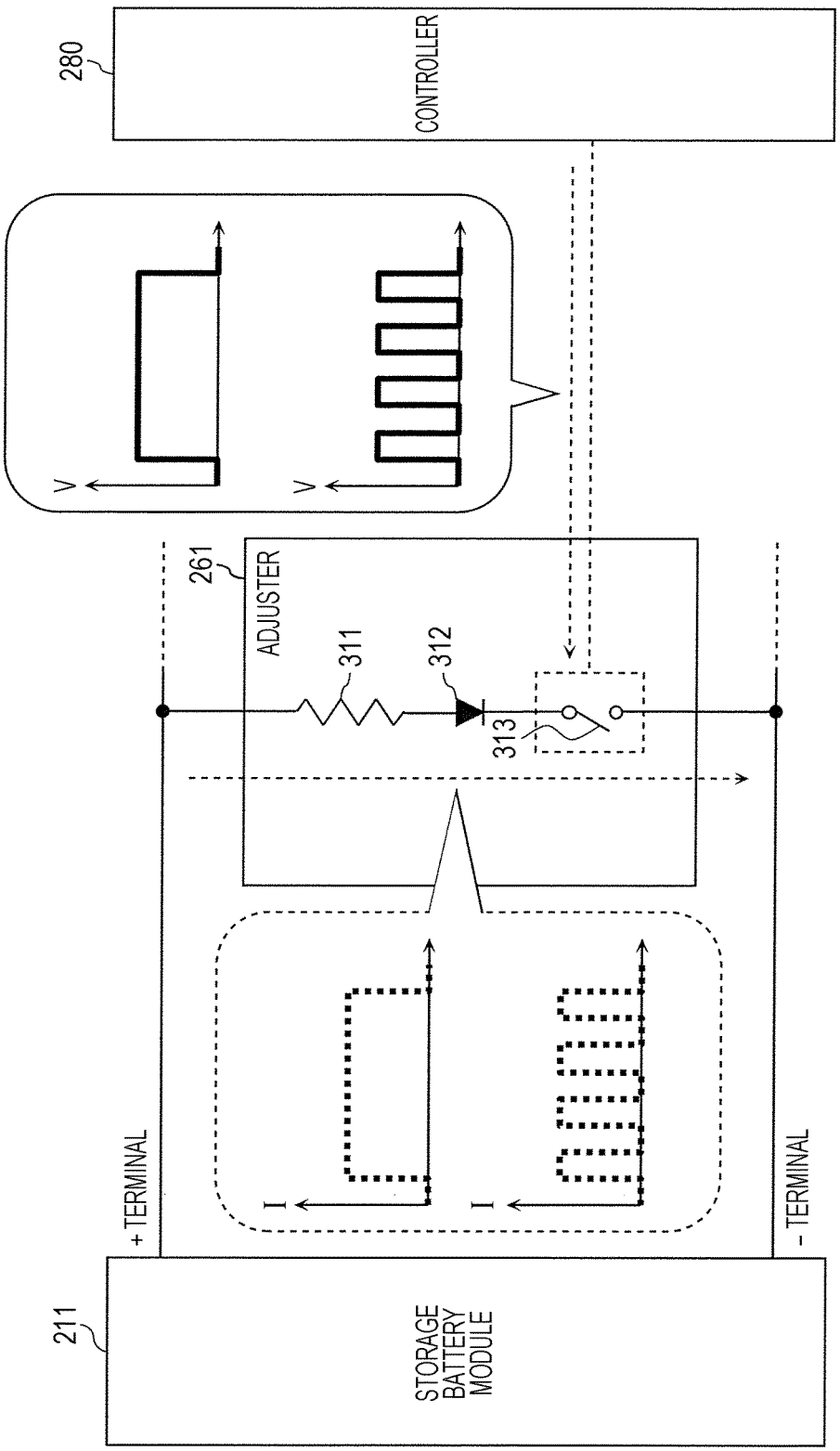
FIG. 5 is a schematic diagram showing the configuration of an adjuster of the second embodiment.

FIG. 5 is a schematic diagram showing the configuration of the adjuster 261 shown in FIG. 4. As shown in FIG. 5, the adjuster 261 includes, for example, a resistor 311, a diode 312, and a switch 313.

The resistor 311 is an element for providing an electric resistance and limits the current flowing through the adjuster 261.

The diode 312 is an element having a rectification effect of limiting the direction of the current flowing through the adjuster 261. In this case, the diode 312 limits the current direction to the direction from the positive side to the negative side of the storage battery module 211.

The switch 313 is an element for opening and closing the circuit. Specifically, the switch 313 switches between control where the adjuster 261 passes the current and control where it does not pass the current, under the control of the controller 280. The switch 313 may be a relay or a field-effect transistor (FET).

For example, the switch 313 switches between open and close in accordance with a voltage applied by the controller 280. Specifically, when a voltage is applied, the switch 313 closes the circuit so that the adjuster 261 passes the current. On the other hand, when no voltage is applied, the switch 313 opens the circuit so that the adjuster 261 does not pass the current. The controller 280 can change and adjust the amount of the current by changing the duty ratio of the period in which a voltage is applied.

The adjusters 262 and 263 may include elements equivalent to those of the adjuster 261 shown in FIG. 5. The controller 280 can individually adjust the remaining capacities of the storage battery modules 211, 212, and 213 by adjusting the amounts of the currents flowing through the adjusters 261, 262, and 263.

Figure 6:
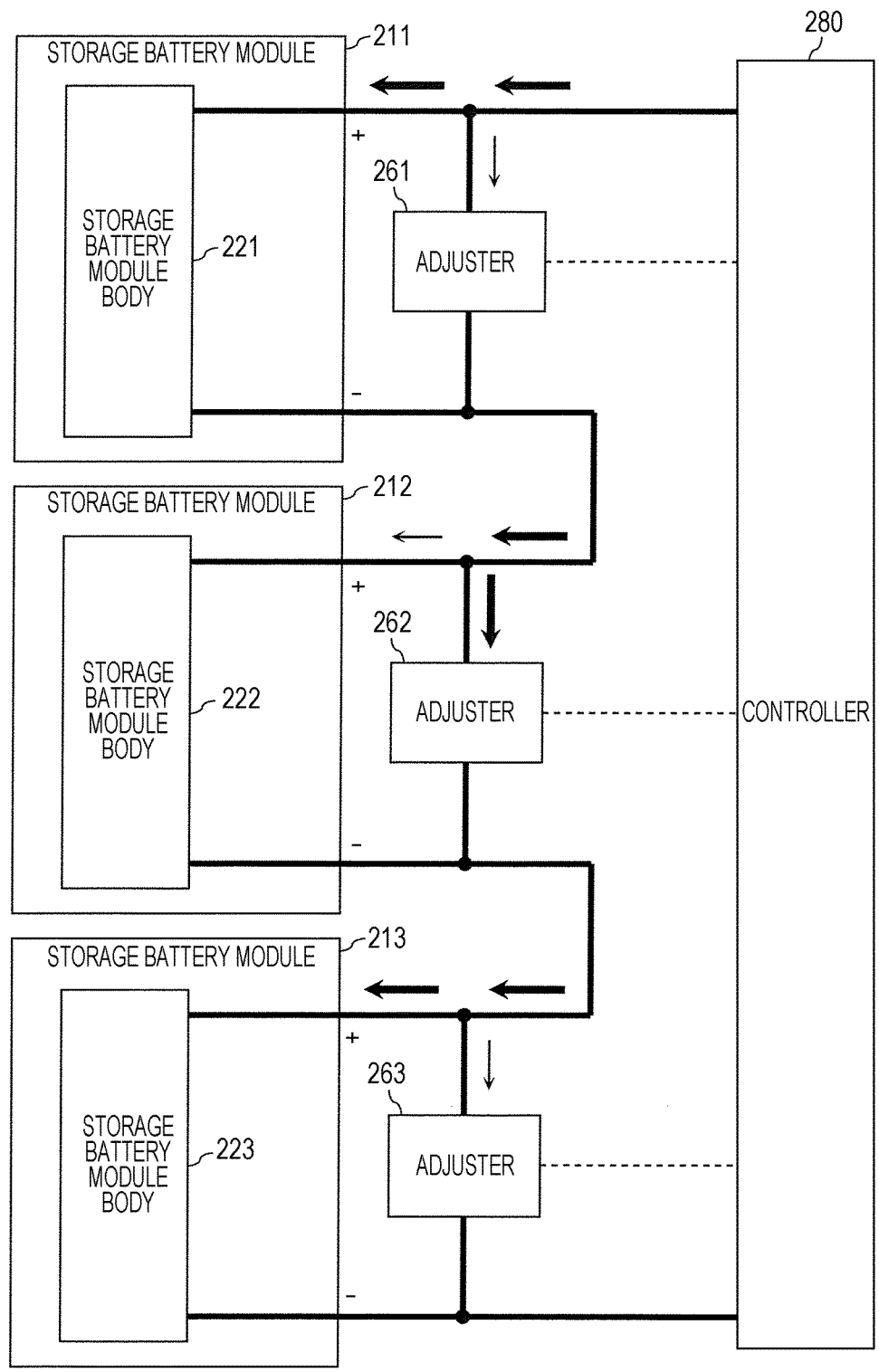
FIG. 6 is a schematic diagram showing the operation of the power storage device of the second embodiment during a charge.

FIG. 6 is a schematic diagram showing the operation of the power storage device 200 shown in FIG. 4 during a charge. In an example shown in FIG. 6, the storage battery module 212 has the highest degree of degradation. That is, the storage battery module 212 has degraded to the highest degree. In FIG. 6, the thickness of an arrow represents the size of the amount of current, that is, a thicker arrow represents a larger amount of current.

In this example, the controller 280 increases the amount of the current flowing through the adjuster 262 disposed in parallel with the storage battery module 212 having the highest degree of degradation. The controller 280 also reduces the amounts of the currents flowing through the adjusters 261 and 263. The controller 280 may control the adjusters 261, 262, and 263 so that a current flows through the adjuster 262 and no current flows through the adjusters 261 and 263.

Thus, the controller 280 can increase the amounts of the currents charged into the storage battery modules 211 and 213 and reduce the amount of the current charged into the storage battery module 212. That is, during a charge, the power storage device 200 can reduce the usage of the storage battery module 212 having the highest degree of degradation, of the storage battery modules 211, 212, and 213.

Thus, the power storage device 200 can suppress the degradation of the storage battery module 212 having the highest degree of degradation. As a result, the power storage device 200 can suppress the local degradation of the storage battery modules 211, 212, and 213.

In the example shown in FIG. 6, the current bypassing the storage battery module 211 flows through the adjuster 261; the current bypassing the storage battery module 212 flows through the adjuster 262; and the current bypassing the hook 213 flows through the adjuster 263.

However, before staring a charge or during a suspension of the charge, the current discharged from the storage battery module 211 may flow through the adjuster 261; the current discharged from the storage battery module 212 may flow through the adjuster 262; and the current discharged from the storage battery module 213 may flow through the adjuster 263. Thus, the remaining capacities of the storage battery modules 211, 212, and 213 are adjusted appropriately.

The amounts of the currents flowing through the adjusters 261, 262, and 263 may be adjusted in accordance with the degrees of degradation of the storage battery modules 211, 212, and 213. For example, the amount of the current flowing through the adjuster 262 corresponding to the storage battery module 212 having the highest degree of degradation may be the greatest, and the amount of the current flowing through the adjuster 263 corresponding to the storage battery module 213 having the second highest degree of degradation may be the second greatest. The amount of the current flowing through the adjuster 261 corresponding to the storage battery module 211 having the lowest degree of degradation may be the smallest.

Figure 7:
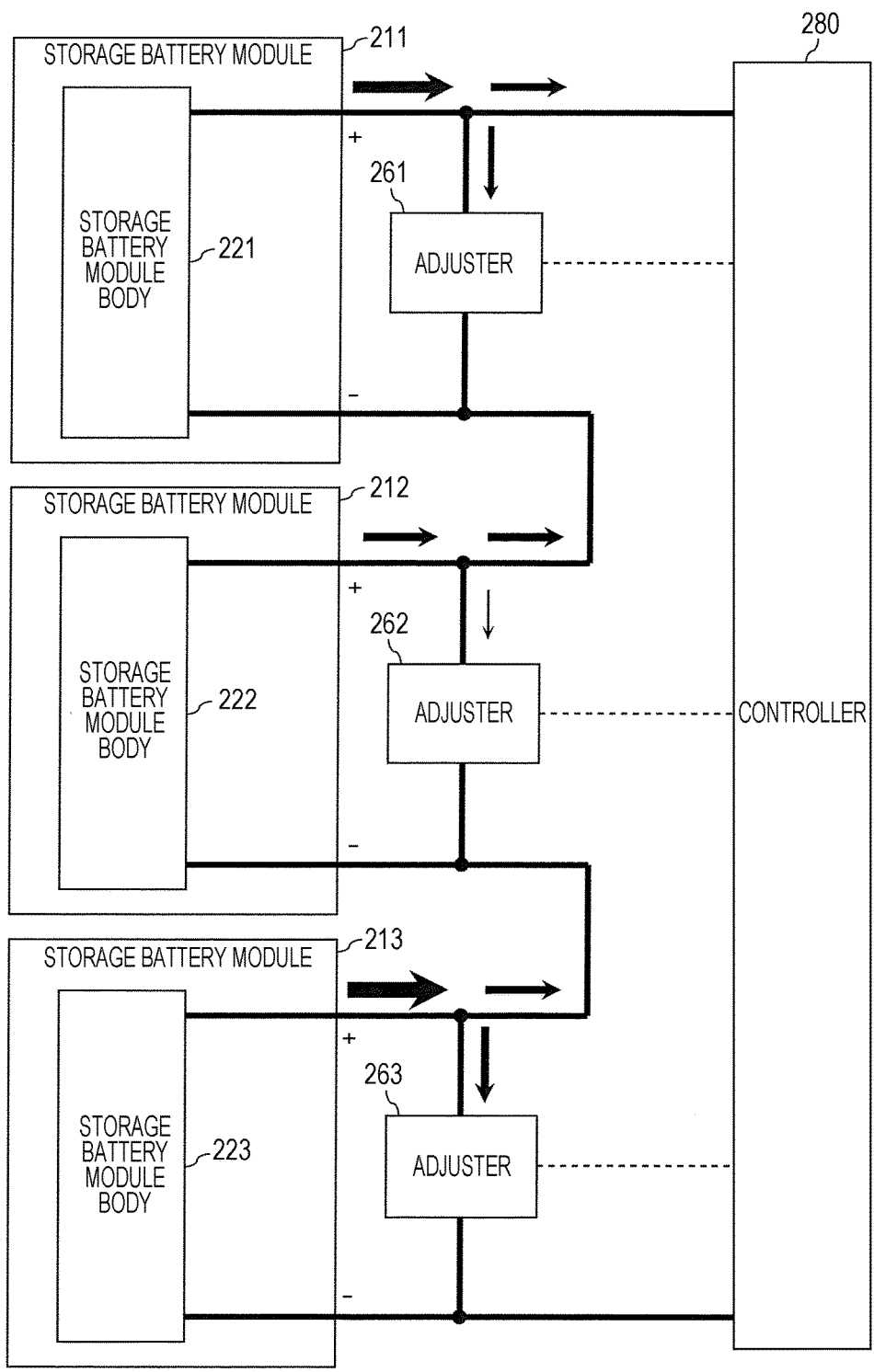
FIG. 7 is a schematic diagram showing the operation of the power storage device of the second embodiment during a discharge.

FIG. 7 is a schematic diagram showing the operation of the power storage device 200 shown in FIG. 4 during a discharge. In an example shown in FIG. 7, as in the example shown in FIG. 6, the storage battery module 212 has the highest degree of degradation. That is, the storage battery module 212 has degraded to the highest degree. In FIG. 7, as in FIG. 6, the thickness of an arrow represents the size of the amount of current, that is, a thicker arrow represents a greater amount of current.

In this example, the controller 280 reduces the amount of the current flowing through the adjuster 262 disposed in parallel with the storage battery module 212 having the highest degree of degradation. The controller 280 also increases the amounts of the currents flowing through the adjusters 261 and 263. The controller 280 may control the adjusters 261, 262, and 263 so that currents flow through the adjusters 261 and 263 but no current flows through the adjuster 262.

The currents flowing through the adjusters 261, 262, and 263 are currents discharged from the storage battery modules 211, 212, and 213 and are consumed by the adjusters 261, 262, and 263. As the amounts of the currents flowing through the adjusters 261, 262, and 263 are increased, the amounts of the currents discharged from the storage battery modules 211, 212, and 213 are increased.

In this case, the amounts of the currents flowing through the adjuster 261 and 263 are greater than the amount of the current flowing through the adjuster 262. Accordingly, the amounts of the currents discharged from the storage battery modules 211 and 213 are greater than the amount of the current discharged from the storage battery module 212. On the other hand, the amount of the current flowing through the adjuster 262 is smaller than the amounts of the currents flowing through the adjusters 261 and 263. Accordingly, the amount of the current discharged from the storage battery module 212 is smaller than the amounts of the currents discharged from the storage battery modules 211 and 213.

That is, the controller 280 can increase the amounts of the currents discharged from the storage battery modules 211 and 213 by increasing the amounts of the currents flowing through the adjusters 261 and 263. Also, the controller 280 can reduce the amount of the current discharged from the storage battery module 212 by reducing the amount of the current flowing through the adjuster 262. Thus, during a discharge, the power storage device 200 can make the usage of the storage battery module 212 having the highest degree of degradation smaller than those of the storage battery modules 212 and 213.

As a result, the power storage device 200 can suppress the degradation of the storage battery module 212 having the highest degree of degradation compared to that of the storage battery modules 211 and 213 and thus can suppress the local degradation of the storage battery modules 211, 212, and 213.

Before starting a discharge of the power storage device 200 or during a suspension of the discharge, the controller 280 may control the adjusters 261, 262, and 263 so that the currents discharged from the storage battery modules 211, 212, and 213 flow through the adjusters 261, 262, and 263. That is, before starting a discharge of the power storage device 200 or during a suspension of the discharge, the controller 280 may perform a discharge for adjustment inside the power storage device 200.

The amounts of the currents flowing through the adjusters 261, 262, and 263 may be adjusted in accordance with the degrees of degradation of the storage battery modules 211, 212, and 213. For example, the amount of the current flowing through the adjuster 262 corresponding to the storage battery module 212 having the highest degree of degradation may be the smallest; the amount of the current flowing through the adjuster 263 corresponding to the storage battery module 213 having the second highest degree of degradation may be the second smallest; and the amount of the current flowing through the adjuster 261 corresponding to the storage battery module 211 having the lowest degree of degradation may be the greatest.

Figure 8:
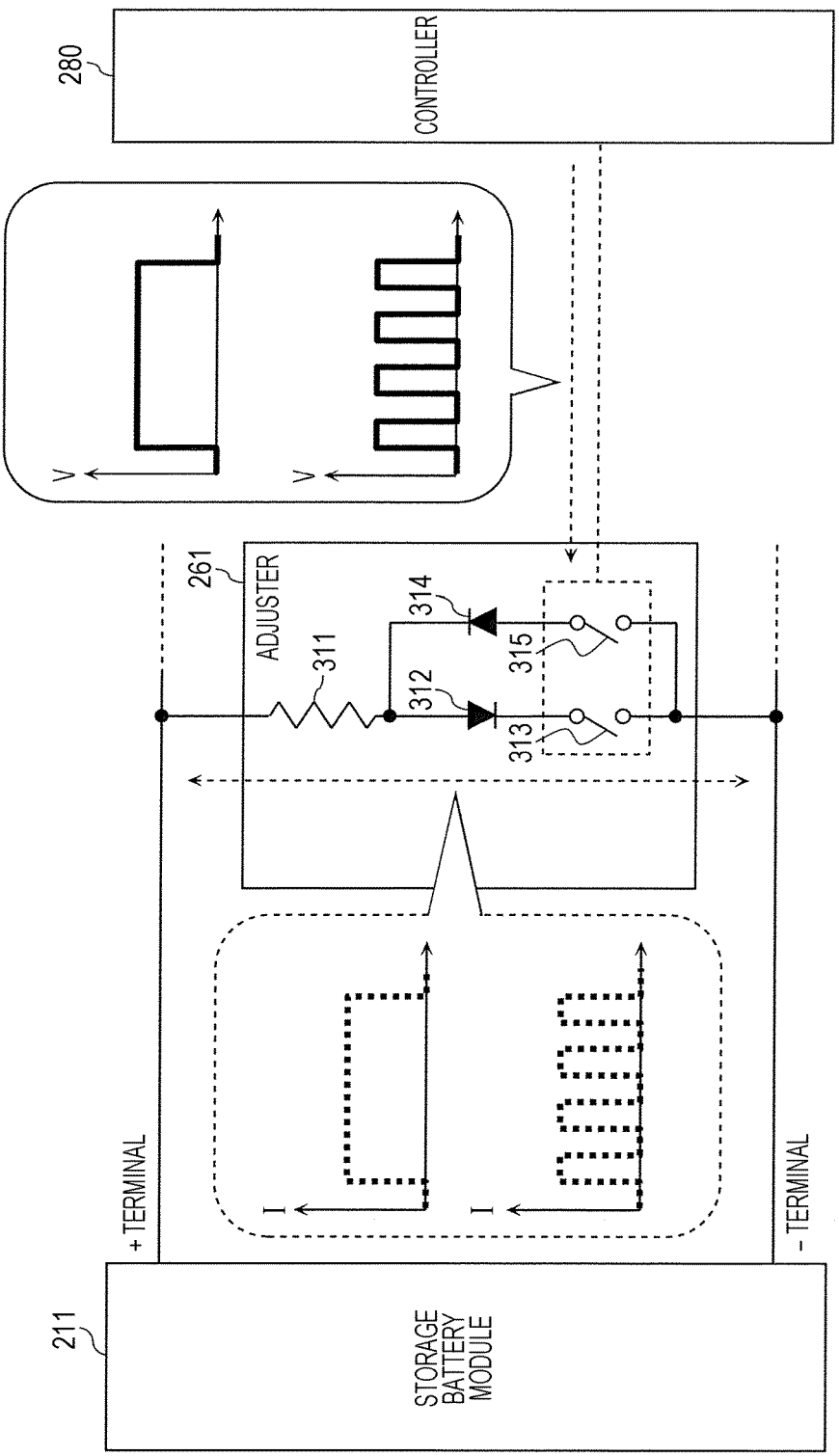
FIG. 8 is a schematic diagram showing another example of the configuration of the adjuster of the second embodiment.

FIG. 8 is a schematic diagram showing another example of the configuration of the adjuster 261 shown in FIG. 4. As shown in FIG. 8, the adjuster 261 may include the resistor 311, the diode 312, the switch 313, a diode 314, and a switch 315. In the example shown in FIG. 8, the adjuster 261 additionally includes the diode 314 and switch 315 compared to that shown in FIG. 5. Specifically, the diode 314 and switch 315 are disposed in parallel with the diode 312 and switch 313.

As with the diode 312, the diode 314 is an element having a rectification effect of limiting the direction of the current flowing through the adjuster 261. In this case, the diode 314 limits the current direction to the direction from the negative side to the positive side of the storage battery module 211.

As with the switch 313, the switch 315 is an element for opening and closing the circuit. Specifically, the switch 315 switches between control where the adjuster 261 passes the current and control where it does not pass the current, under the control of the controller 280. The switch 315 may be a relay or a field-effect transistor (FET).

For example, as with the switch 313, the switch 315 switches between open and close in accordance with a voltage applied by the controller 280. Specifically, when a voltage is applied, the switch 315 closes the circuit so that the adjuster 261 passes the current. On the other hand, when no voltage is applied, the switch 315 opens the circuit so that the adjuster 261 does not pass the current. The controller 280 can change and adjust the amount of current by changing the duty ratio of the period in which a voltage is applied.

Note that a voltage value for turning on the switch 313, a voltage value for turning on the switch 315, and a voltage value for turning on both the switches 313 and 315 may differ from each other. If so, the controller 280 can separately turn on or off the switches 313 and 315.

The path between the controller 280 and switch 313 and the path between the controller 280 and switch 315 may be different. If so, the controller 280 can separately turn on or off the switches 313 and 315.

The adjusters 262 and 263 may include elements equivalent to those of the adjuster 261 shown in FIG. 8. If so, the controller 280 can appropriately adjust the amounts of the currents bi-directionally flowing through the adjusters 261, 262, and 263.

Figure 9:
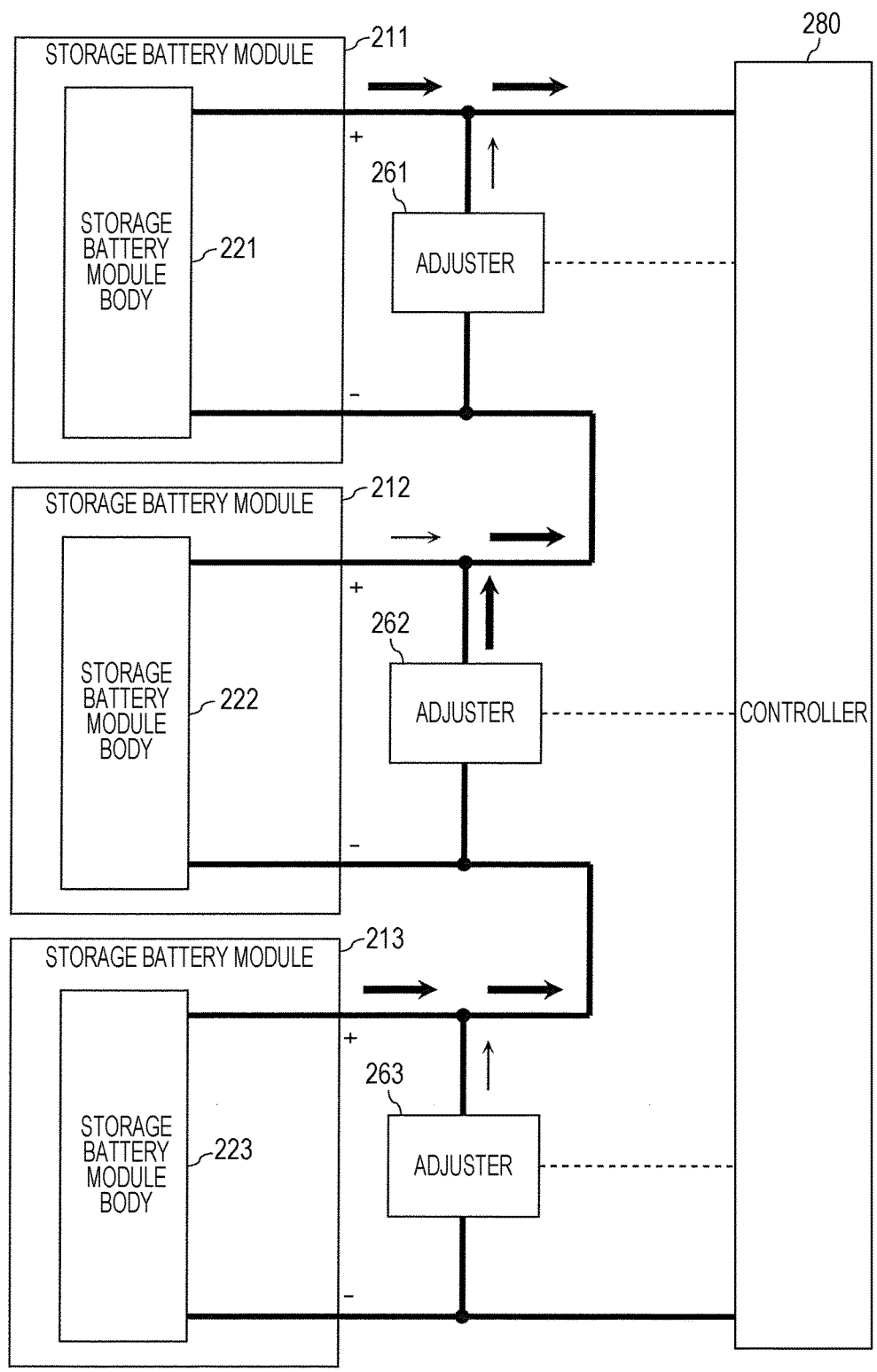
FIG. 9 is a schematic diagram showing another example of the operation of the power storage device of the second embodiment during a discharge.

FIG. 9 is a schematic diagram showing another example of the operation of the power storage device 200 shown in FIG. 4 during a discharge. In this example, the adjuster 261 shown in FIG. 8 is used, and the adjusters 262 and 263 including elements equivalent to those of the adjuster 261 shown in FIG. 8 are used. In this example, as in the example shown in FIG. 7, the storage battery module 212 has the highest degree of degradation. That is, the storage battery module 212 has degraded to the highest degree. In FIG. 9, as in FIG. 7, the thickness of an arrow represents the size of the amount of current, that is, a thicker arrow represents a greater amount of current.

In this example, the controller 280 increases the amount of the current flowing from the negative terminal to the positive terminal of the storage battery module 212 through the adjuster 262 disposed in parallel with the storage battery module 212 having the highest degree of degradation. Thus, the amount of the current flowing from the adjuster 262 toward the positive side of the storage battery module 212 is increased. As a result, the amount of the current discharged from the storage battery module 212 is reduced.

The controller 280 also reduces the amount of the current flowing from the negative terminal to the positive terminal of the storage battery module 211 through the adjuster 261. Thus, the amount of the current flowing from the adjuster 261 toward the positive side of the storage battery module 211 is reduced. As a result, the amount of the current discharged from the storage battery module 211 is increased.

The controller 280 also reduces the amount of the current flowing from the negative terminal to the positive terminal of the storage battery module 213 through the adjuster 263. Thus, the amount of the current flowing from the adjuster 263 toward the positive side of the storage battery module 213 is reduced. As a result, the amount of the current discharged from the storage battery module 213 is increased.

The controller 280 may control the adjusters 261, 262, and 263 so that the adjuster 262 passes the current flowing from the negative terminal to the positive terminal of the storage battery module 212 and the adjusters 261 and 263 do not pass such currents.

Owing to the above operation, the controller 280 can increase the amounts of the currents discharged from the storage battery modules 211 and 213 and reduce the amount of the current discharged from the storage battery module 212. That is, during a discharge, the power storage device 200 can reduce the usage of the storage battery module 212 having the highest degree of degradation, of the storage battery modules 211, 212, and 213.

Thus, the power storage device 200 can suppress the degradation of the storage battery module 212 having the highest degree of degradation. As a result, the power storage device 200 can suppress the local degradation of the storage battery modules 211, 212, and 213.

In the example shown in FIG. 9, during the discharge of the power storage device 200, the current bypassing the storage battery module 211 flows through the adjuster 261; the current bypassing the storage battery module 212 flows through the adjuster 262; and the current bypassing the storage battery module 213 flows through the adjuster 263.

The amounts of the currents flowing through the adjusters 261, 262, and 263 may be adjusted in accordance with the degrees of degradation of the storage battery modules 211, 212, and 213. For example, the amount of the current flowing through the adjuster 262 corresponding to the storage battery module 212 having the highest degree of degradation may be the greatest; the amount of the current flowing through the adjuster 263 corresponding to the storage battery module 213 having the second highest degree of degradation may be the second greatest; and the amount of the current flowing through the adjuster 261 corresponding to the storage battery module 211 having the lowest degree of degradation may be the smallest.

Figure 10:
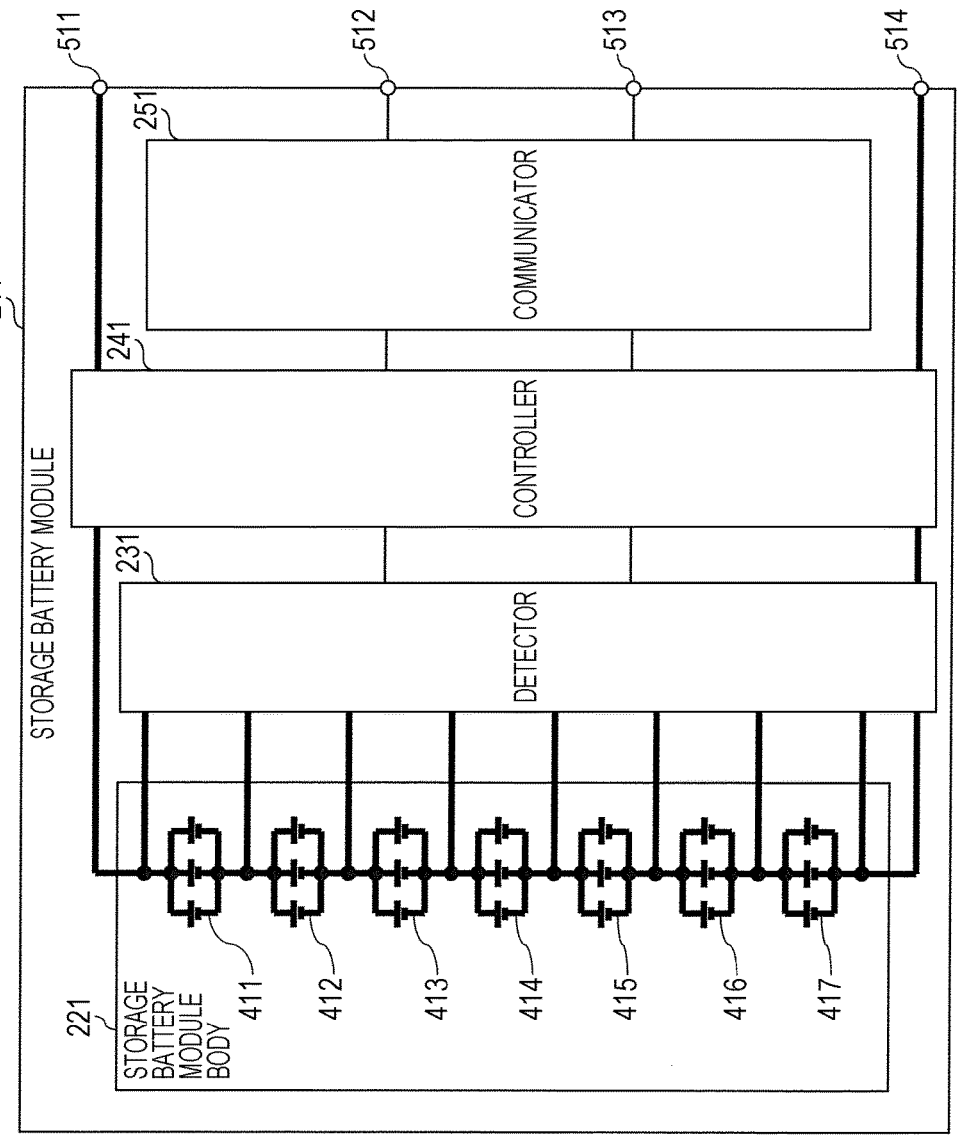
FIG. 10 is a block diagram showing the configuration of a storage battery module of the second embodiment.

FIG. 10 is a block diagram showing the configuration of the storage battery module 211 shown in FIG. 4. FIG. 10 shows a more specific example of the storage battery module 211 shown in FIG. 4. As in FIG. 4, the storage battery module 211 shown in FIG. 10 includes the storage battery module body 221, detector 231, controller 241, and communicator 251. FIG. 10 also shows terminals 511 to 514. In the example shown in FIG. 10, the storage battery module body 221 includes storage battery blocks 411 to 417.

The terminal 511 is a positive electric terminal of the storage battery module 211. The terminal 512 is a communication terminal of the storage battery module 211 and is, for example, an input terminal for inputting information to the storage battery module 211. The terminal 513 is a communication terminal of the storage battery module 211 and is, for example, an output terminal for outputting information from the storage battery module 211. The terminal 514 is a negative electric terminal of the storage battery module 211. The terminals 511 to 514 are connected to the power storage device 200.

The storage battery blocks 411 to 417 are also called battery blocks and typically each include multiple storage batteries. A storage battery is also called a unit cell or a cell. In this example, the storage battery blocks 411 to 417 each include multiple storage batteries connected in parallel. The storage battery blocks 411 to 417 may each be a single storage battery.

The detector 231 and controller 241 outputs the degree of degradation of a storage battery block which has degraded to the highest degree, of the storage battery blocks 411 to 417 as the degree of degradation of the storage battery module 211 through the communicator 251. For example, if the storage battery block 414 of the storage battery blocks 411 to 417 has degraded to the highest degree, the detector 231 and controller 241 outputs the degree of degradation of the storage battery block 414 as the degree of degradation of the storage battery module 211 through the communicator 251.

The degrees of degradation of the storage battery blocks 411 to 417 to 417 are typically determined on the basis of the internal resistance, charge voltage, discharge voltage, or the like. For example, the degree of degradation may correspond to the internal resistance. It is conceivable that as a storage battery block degrades, the internal resistance thereof increases. For this reason, it may be determined that a storage battery block having a higher internal resistance has a higher degree of degradation.

The degree of degradation may correspond to the charge voltage. It is conceivable that as a storage battery block degrades, the internal resistance thereof increases and thus the charge voltage increases. Specifically, it is conceivable that as the degree of degradation of a storage battery block is increased, the charge voltage thereof is increased with respect to the same charge current. For this reason, it may be determined that a storage battery block having a higher charge voltage has a higher degree of degradation.

The degree of degradation may correspond to the discharge voltage. It is conceivable that as a storage battery block degrades, the internal resistance thereof increases and the discharge voltage thereof decreases. Specifically, it is conceivable that as the degree of degradation of a storage battery block is increased, the discharge voltage thereof is reduced with respect to the same discharge current. For this reason, it may be determined that a storage battery block having a lower discharge voltage has a higher degree of degradation.

The degree of degradation may be determined on the basis of a combination of the internal resistance, charge voltage, and discharge voltage. The degree of degradation may also be determined on the basis of the degree of change in the internal resistance, charge voltage, or discharge voltage during a charge and during a discharge. Specifically, it is conceivable that as the degree of degradation is increased with respect to the same charge current or discharge current, the degree of change in the internal resistance, charge voltage, or discharge voltage is increased. For this reason, it may be determined that a storage battery block having a higher degree of change in the internal resistance, charge voltage, or discharge voltage has a higher degree of degradation.

The detector 231 detects the quantities of state of the storage battery blocks 411 to 417. In particular, with no current flowing through the adjuster 261, the detector 231 detects the charge voltages or discharge voltages of the storage battery blocks 411 to 417 and currents flowing through the storage battery blocks 411 to 417. Thus, the influence of an adjustment current is eliminated. The detector 231 may detect the internal resistances on the basis of the detected voltages and currents.

The controller 241 determines the degrees of degradation of the storage battery blocks 411 to 417 on the basis of the quantities of state detected by the detector 231. The controller 241 may acquire the internal resistances on the basis of the detected voltages and currents and determine the degrees of degradation on the basis of the acquired internal resistances.

The controller 241 determines the highest of the degrees of degradation of the storage battery blocks 411 to 417 as the degree of degradation of the storage battery module 211 and transmits the degree of degradation of the storage battery module 211 through the communicator 251. The controller 280 of the power storage device 200 receives the degree of degradation of the storage battery module 211 through the communicator 270 of the power storage device 200 and controls the adjuster 261 on the basis of the degree of degradation of the storage battery module 211.

The storage battery modules 212 and 213 may include elements equivalent to those of the storage battery module 211 shown in FIG. 10. Thus, the adjusters 261, 262, and 263 are controlled on the basis of the degrees of degradation of the respective most highly degraded storage battery blocks of the storage battery modules 211, 212, and 213. This results in the suppression of local degradation and the extension of the life of the entire storage battery modules 211, 212, and 213.

The degrees of degradation may be estimated on the basis of the temperatures of the storage battery modules 211, 212, and 213 or the temperatures of the storage battery blocks 411 to 417. The degrees of degradation may also be estimated on the basis of the number of charges and discharges. The degree of degradation may correspond to state of health (SOH), which indicates the current full charge capacity with respect to the initial full charge capacity. For example, a lower SOH represents a higher degree of degradation.

Figure 11:
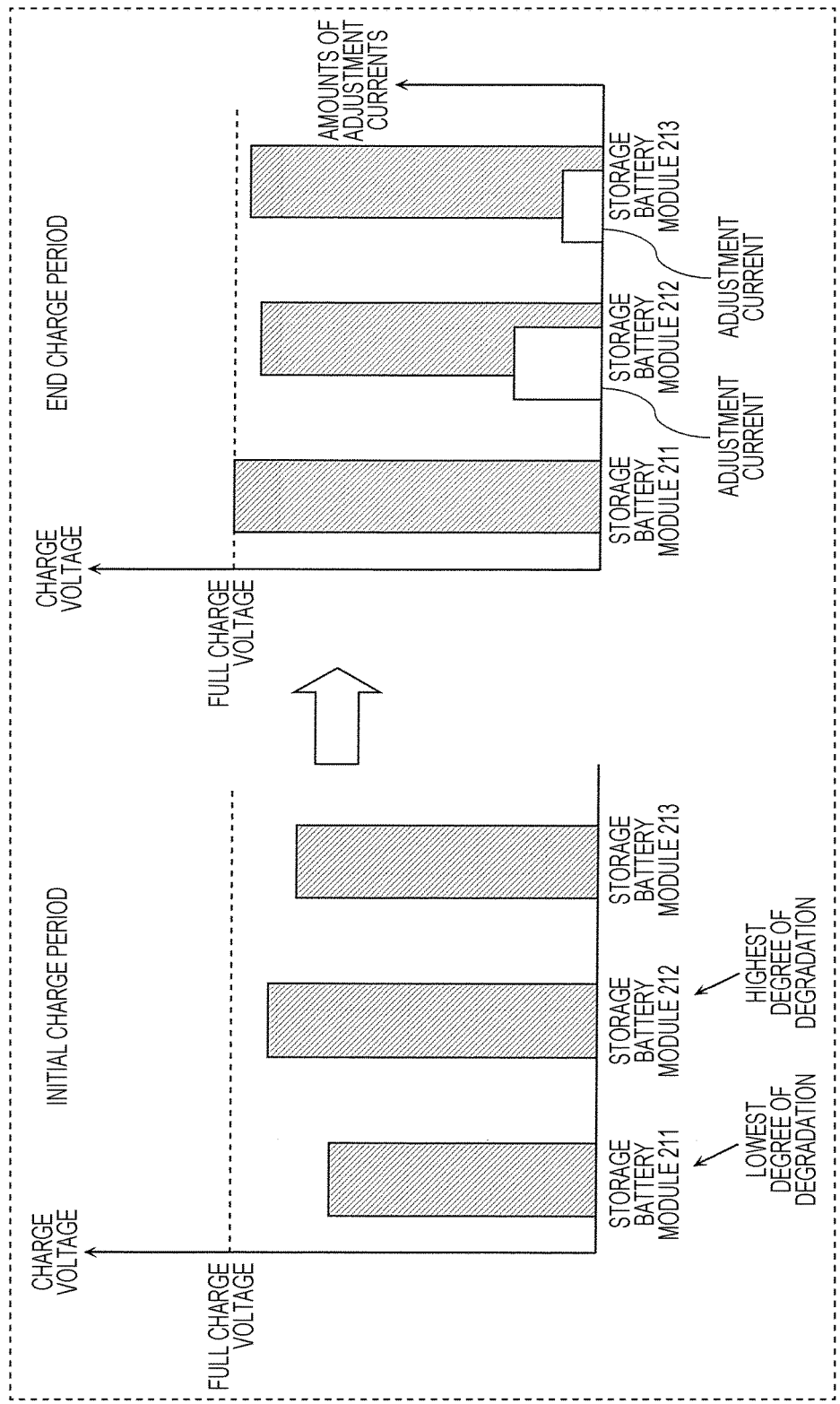
FIG. 11 is a schematic diagram showing the voltage state of the second embodiment during a charge.

FIG. 11 is a schematic diagram showing the voltage state of the power storage device 200 shown in FIG. 4 during a charge. In this example, it is assumed that the storage battery module 211 has the lowest degree of degradation and that the storage battery module 212 has the highest degree of degradation. The charge voltages of the storage battery modules 211, 212, and 213 in FIG. 11 may be the charge voltages of the respective storage battery blocks having the highest degree of degradation.

The controller 280 does not pass currents through the adjusters 261, 262, and 263 in the initial charge period. A more highly degraded storage battery module has a higher charge voltage with respect to the same charge current. Accordingly, in this example, in the initial charge period, the charge voltage of the storage battery module 212 is the highest; the charge voltage of the storage battery module 213 is the second highest; and the charge voltage of the storage battery module 211 is the lowest.

For example, in the initial charge period, the charge voltages of the storage battery modules 211, 212, and 213 may be detected as the degrees of degradation thereof. The controller 280 of the power storage device 200 determines the amounts of adjustment currents, which are the currents flowing through the adjusters 261, 262, and 263, on the basis of the detected degrees of degradation.

For example, during a charge, the control shown in FIG. 6 is performed. In accordance with the degrees of degradation, the controller 280 determines, as the maximum amount of the adjustment current, the amount of the adjustment current flowing through the adjuster 262 corresponding to the storage battery module 212 and determines, as 0, the amount of the adjustment current flowing through the adjuster 261 corresponding to the storage battery module 211. The controller 280 may determine the amount of the adjustment current flowing through the adjuster 263 corresponding to the storage battery module 213 as a value smaller than the maximum amount of the adjustment current and greater than 0 in accordance with the degrees of degradation.

In the end charge period, the controller 280 controls the amounts of the adjustment currents flowing through the adjusters 261, 262, and 263 so that the storage battery module 211 having the lowest degree of degradation is fully charged and the storage battery module 212 having the highest degree of degradation is not fully charged.

That is, the controller 280 defines the charge voltage of the storage battery module 211 as a full charge voltage, sets the charge voltage of the storage battery module 212 to a lower voltage than the full charge voltage, and then stops the charge. In other words, the controller 280 defines sets the voltage of the storage battery module 211 as a charge end voltage, sets the voltage of the storage battery module 212 to a lower voltage than the charge end voltage, and then stops the charge. As used herein, the charge end voltage refers to a predetermined voltage at which a charge is stopped. When the charge voltage reaches the charge end voltage, the charge is stopped.

Figure 12:
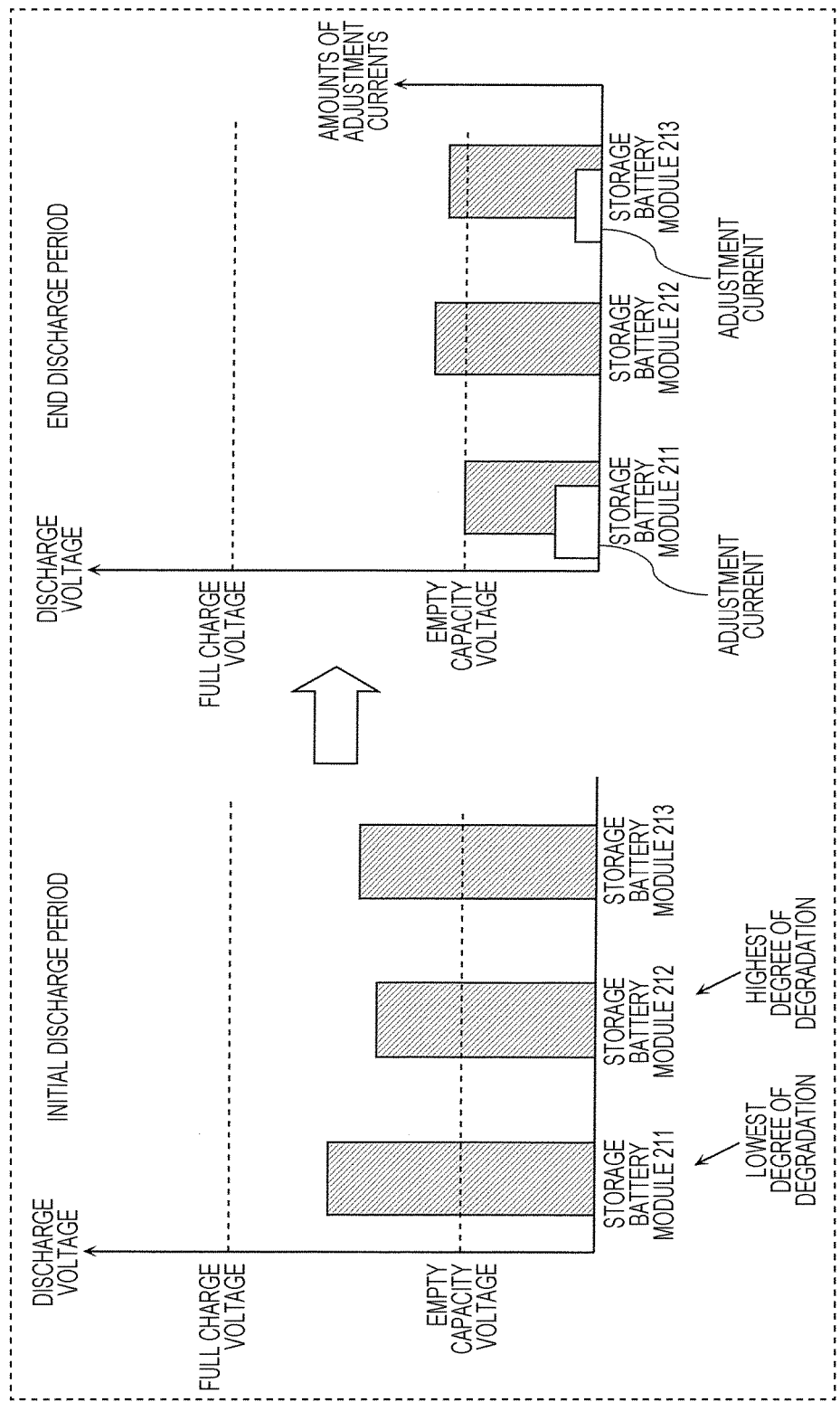
FIG. 12 is a schematic diagram showing the voltage state of the second embodiment during a discharge.

FIG. 12 is a schematic diagram showing the voltage state of the power storage device 200 shown in FIG. 4 during a discharge. In this example, as in the example shown in FIG. 11, it is assumed that the storage battery module 211 has the lowest degree of degradation and that the storage battery module 212 has the highest degree of degradation. The discharge voltages of the storage battery modules 211, 212, and 213 in FIG. 12 may be the discharge voltages of the respective most highly degraded storage battery blocks.

In the initial discharge period, the controller 280 does not pass currents through the adjusters 261, 262, and 263. A more highly degraded storage battery module has a lower discharge voltage with respect to the same discharge current. Accordingly, in this example, in the initial discharge period, the discharge voltage of the storage battery module 212 is the lowest; the discharge voltage of the storage battery module 213 is the second lowest; and the discharge voltage of the storage battery module 211 is the highest.

For example, in the initial discharge period, the storage battery modules 211, 212, and 213 may be each detected as a storage battery module which has a lower degree of degradation when it has a higher discharge voltage. The controller 280 of the power storage device 200 determines the amounts of adjustment currents, which are the currents flowing through the adjusters 261, 262, and 263, on the basis of the detected degrees of degradation.

For example, during a discharge, the control shown in FIG. 7 is performed. In accordance with the degrees of degradation, the controller 280 determines, as 0, the amount of the adjustment current flowing through the adjuster 262 corresponding to the storage battery module 212 and determines, as the maximum amount of the adjustment current, the amount of the adjustment current flowing through the adjuster 261 corresponding to the storage battery module 211. The controller 280 may determine the amount of the adjustment current flowing through the adjuster 263 corresponding to the storage battery module 213 as a value smaller than the maximum amount of the adjustment current and greater than 0 in accordance with the degrees of degradation.

In the end discharge period, the controller 280 controls the amounts of the adjustment currents flowing through the adjusters 261, 262, and 263 so that the storage battery module 211 having the lowest degree of degradation is emptied and the storage battery module 212 having the highest degree of degradation is not emptied.

That is, the controller 280 defines the discharge voltage of the storage battery module 211 as an empty capacity voltage, sets the discharge voltage of the storage battery module 212 to a higher voltage than the empty capacity voltage, and then stops the discharge. In other words, the controller 280 defines the voltage of the storage battery module 211 as a discharge end voltage, sets the voltage of the storage battery module 212 to a higher voltage than the discharge end voltage, and then stops the discharge. As used herein, the discharge end voltage refers to a predetermined voltage at which a discharge is stopped. When the discharge voltage reaches the discharge end voltage, the discharge is stopped.

Figure 13:
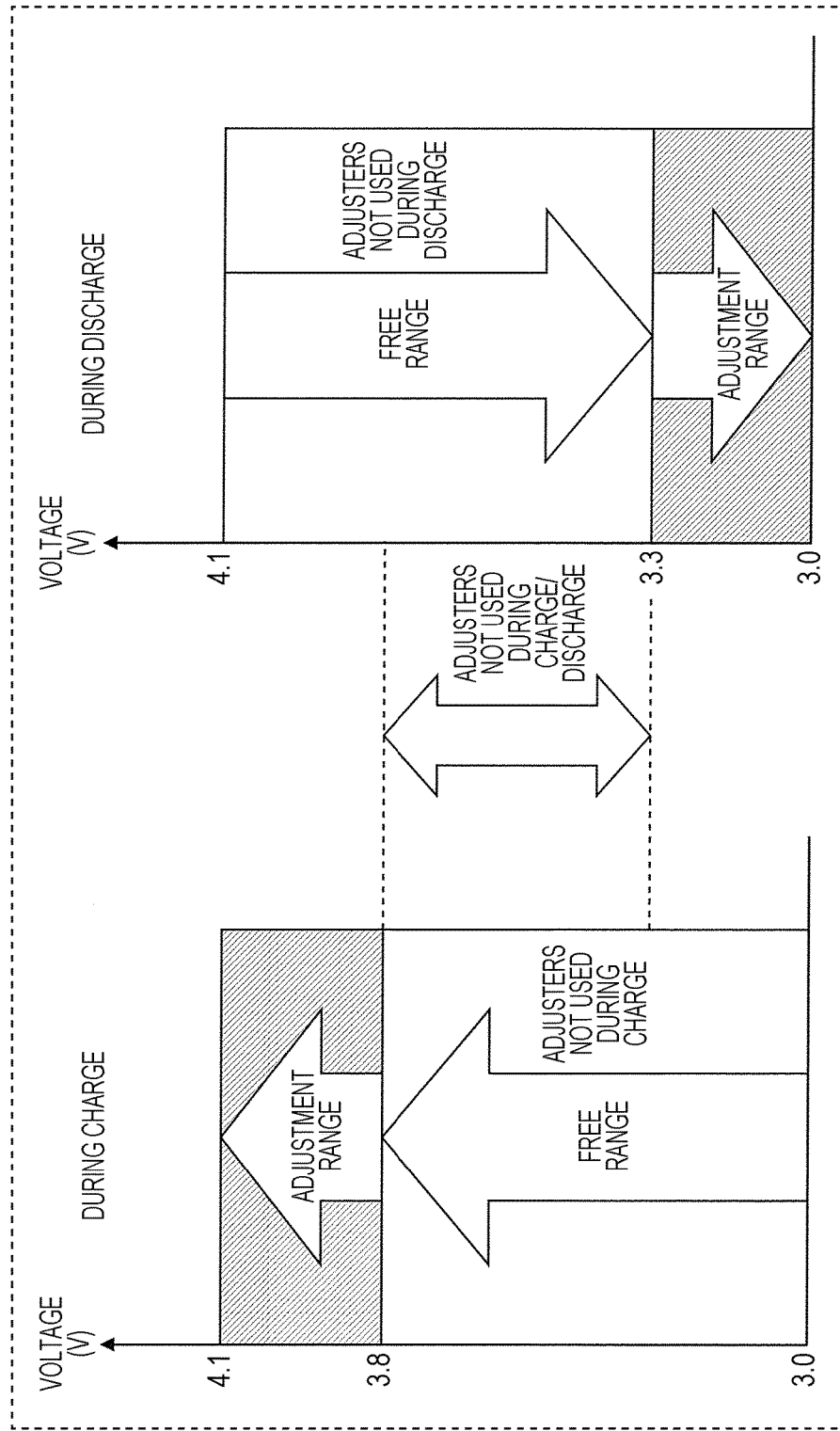
FIG. 13 is a conceptual diagram showing an adjustment range of the second embodiment.

FIG. 13 is a conceptual diagram showing an adjustment range of the power storage device 200 shown in FIG. 4. For example, when currents flow through the adjusters 261, 262, and 263, energy losses occur. Accordingly, it is preferable that the controller 280 not pass currents through the adjusters 261, 262, and 263 when the voltage is in a range in which the voltage has a small influence on degradation.

For this reason, the controller 280 adjusts the amounts of the currents flowing through the adjusters 261, 262, and 263 when the voltage is in a range in which the voltage degrades the storage battery modules 211, 212, and 213 or in a range preceding that range and does not adjust the amounts of currents when the voltage is in the other ranges. For example, as shown in FIG. 13, a voltage range from 3.0 V corresponding to the empty capacity voltage to 4.1 V corresponding to the full charge voltage is divided into a free range and an adjustment range. When the voltage is in the free range, a charge or discharge is freely performed without adjusting the amounts of currents; when the voltage is in the adjustment range, the amounts of currents are adjusted during a charge or during a discharge.

Specifically, when the highest voltage of multiple storage battery blocks is in the free range from 3.0 V to 3.8 V during a charge, the controller 280 does not adjust the amounts of the currents flowing through the adjusters 261, 262, and 263. At this time, the charge is freely performed. On the other hand, when the highest voltage of the storage battery blocks is in the adjustment range from 3.8 V to 4.1 V, the controller 280 adjusts the amounts of the currents flowing through the adjusters 261, 262, and 263. Thus, the charge of the storage battery modules 211, 212, and 213 is adjusted.

That is, during a charge, the charge is performed freely until the highest voltage of multiple storage battery blocks reaches 3.8 V. After the highest voltage of the storage battery blocks reaches 3.8 V, the charge is adjusted by the adjusters 261, 262, and 263.

When the lowest voltage of multiple storage battery blocks is in the free range from 4.1 V to 3.3 V during a discharge, the controller 280 does not adjust the amounts of the currents flowing through the adjusters 261, 262, and 263. At this time, the discharge is freely performed. On the other hand, when the lowest voltage of the storage battery blocks is in the adjustment range from 3.3 V to 3.0 V, the controller 280 adjusts the amounts of the currents flowing through the adjusters 261, 262, and 263. Thus, the discharge of the storage battery modules 211, 212, and 213 is adjusted.

That is, during a discharge, the discharge is performed freely until the lowest voltage of multiple storage battery blocks reaches 3.3 V. After the lowest voltage of the storage battery blocks reaches 3.3 V, the discharge is adjusted by the adjusters 261, 262, and 263.

Note that when the highest voltage of multiple storage battery blocks is 3.0 V to 3.8V and when the lowest voltage thereof is 4.1 V to 3.3 V, both a charge and a discharge are performed freely.

The controller 280 may determine whether the storage battery modules 211, 212, and 213 as a whole are in the free range or adjustment range, on the basis of the highest voltage or lowest voltage of all storage battery blocks included in the storage battery modules 211, 212, and 213. The controller 280 may also determine whether each of the storage battery modules 211, 212, and 213 is in the free range or adjustment range.

For example, the controller 280 may determine whether the storage battery module 211 is in the free range or adjustment range, on the basis of the highest voltage or lowest voltage of the storage battery blocks 411 to 417 of the storage battery module 211. When the highest voltage or lowest voltage of the storage battery blocks 411 to 417 of the storage battery module 211 is in the adjustment range, the controller 280 may adjust the amount of the current flowing through the adjuster 261.

Also, the controller 280 may determine whether the amount of the current flowing through the adjuster 262 should be adjusted, on the basis of the highest voltage or lowest voltage of the storage battery blocks of the storage battery module 212. Also, the controller 280 may determine whether the amount of the current flowing through the adjuster 263 should be adjusted, on the basis of the highest voltage or lowest voltage of the storage battery blocks of the storage battery module 213.

Figure 14:
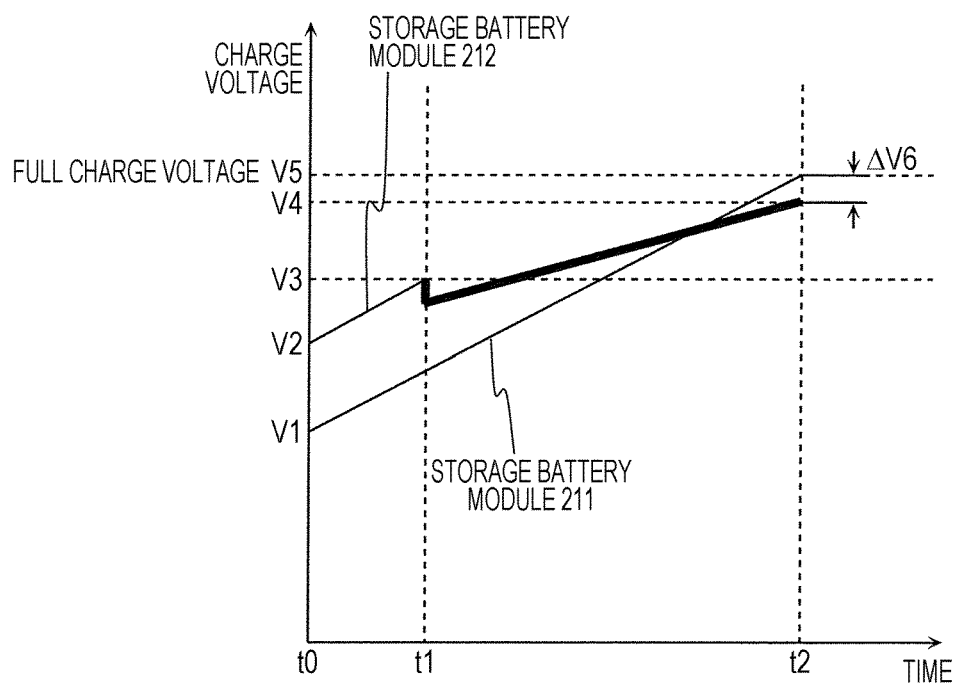
FIG. 14 is a transition diagram showing voltage changes of the second embodiment during a charge.

FIG. 14 is a transition diagram showing changes in the voltage of the power storage device 200 shown in FIG. 4 during a charge. In this example, it is assumed that the storage battery module 211 has a lower degree of degradation and that the storage battery module 212 has a higher degree of degradation. In FIG. 14, a thick line represents changes in voltage that occur during an adjustment.

The charge voltage of the storage battery module 211 may be the charge voltage of a most highly degraded storage battery block of the storage battery module 211. Similarly, the charge voltage of the storage battery module 212 may be the charge voltage of a most highly degraded storage battery block of the storage battery module 212.

In this example, a charge is started from time t0. At the start of the charge, the charge voltage of the storage battery module 211 is V1, and the charge voltage of the storage battery module 212 is V2. As the remaining capacities of the storage battery module 211 and 212 are increased, the charge voltages thereof are increased. At time t1, the charge voltage of the storage battery module 212 reaches V3 corresponding to the threshold of the adjustment range. From time t1 on, the controller 280 passes a current bypassing the storage battery module 212 through the adjuster 262.

Specifically, in this example, the control shown in FIG. 6 is performed. When the controller 280 starts to pass the current bypassing the storage battery module 212 at time t1, the current charged into the storage battery module 212 decreases, and the charge voltage of the storage battery module 212 decreases accordingly. From time t1 on, the rate of increase of the remaining capacity of the storage battery module 212 decreases, and the rate of increase of the charge voltage decreases.

On the other hand, the charge of the storage battery module 211 is normally continued. Thus, at time t2, the storage battery module 211 reaches V5, which is the full charge voltage, ahead of the storage battery module 212. Thus, the charge is stopped.

When the charge is stopped, the charge voltage of the storage battery module 211 is V5, and the charge voltage of the storage battery module 212 is V4, which is lower than V5. That is, the controller 280 makes the voltage of the storage battery module 211 higher than that of the storage battery module 212 and thus makes a difference V5−V4=ΔV6, and then stops the charge.

Figure 15:
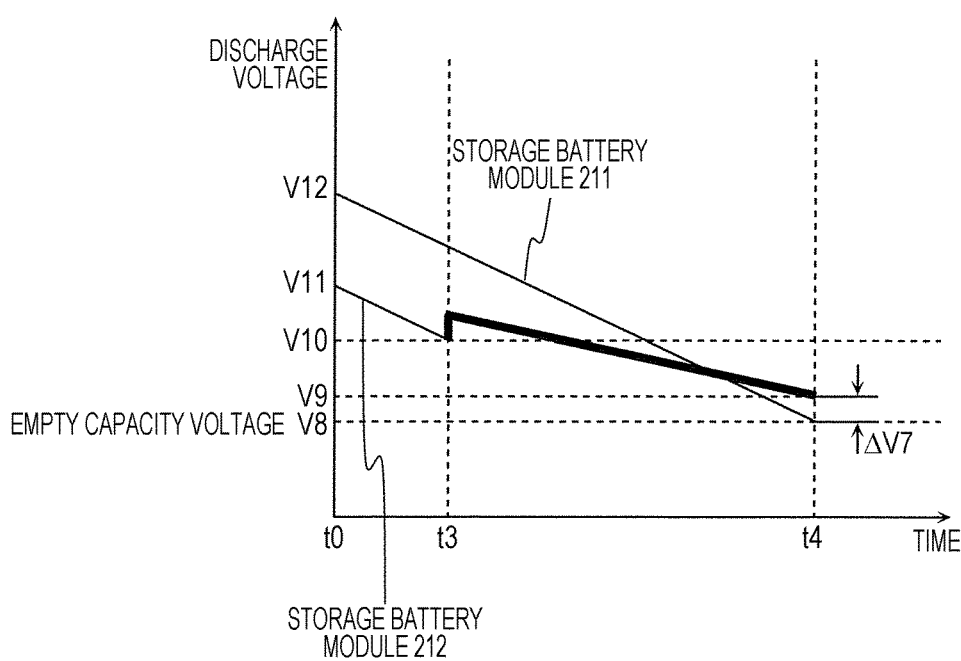
FIG. 15 is a transition diagram showing voltage changes of the second embodiment during a discharge.

FIG. 15 is a transition diagram showing changes in the voltage of the power storage device 200 shown in FIG. 4 during a discharge. In this example, as in the example shown in FIG. 14, it is assumed that the storage battery module 211 has a lower degree of degradation and that the storage battery module 212 has a higher degree of degradation. In FIG. 15, a thick line represents changes in voltage that occur during an adjustment.

The discharge voltage of the storage battery module 211 may be the discharge voltage of a most highly degraded storage battery block of the storage battery module 211. Similarly, the discharge voltage of the storage battery module 212 may be the discharge voltage of a most highly degraded storage battery block of the storage battery module 212.

In this example, a discharge is started from time t0. At the start of the discharge, the discharge voltage of the storage battery module 211 is V12, and the discharge voltage of the storage battery module 212 is V11. As the remaining capacities of the storage battery module 211 and 212 are reduced, the discharge voltages thereof are reduced. At time t3, the discharge voltage of the storage battery module 212 reaches V10, which corresponds to the threshold of the adjustment range. From time t3 on, the controller 280 passes a current bypassing the storage battery module 212 through the adjuster 262.

Specifically, in this example, the control shown in FIG. 9 is performed. When the controller 280 starts to pass the current bypassing the storage battery module 212 at time t3, the current discharged from the storage battery module 212 decreases, and the discharge voltage of the storage battery module 212 increases accordingly. From time t3 on, the rate of decrease of the remaining capacity of the storage battery module 212 decreases, and the rate of decrease of the discharge voltage decreases.

On the other hand, the discharge of the storage battery module 211 is normally continued. Thus, at time t4, the storage battery module 211 reaches V8, which is the empty capacity voltage, ahead of the storage battery module 212. As a result, the discharge is stopped.

When the discharge is stopped, the discharge voltage of the storage battery module 211 is V8, and the charge voltage of the storage battery module 212 is V9, which is higher than V8. That is, the controller 280 makes the voltage of the storage battery module 211 lower than that of the storage battery module 212 and thus makes a difference V9−V8=ΔV7, and then stops the discharge.

Figure 16:
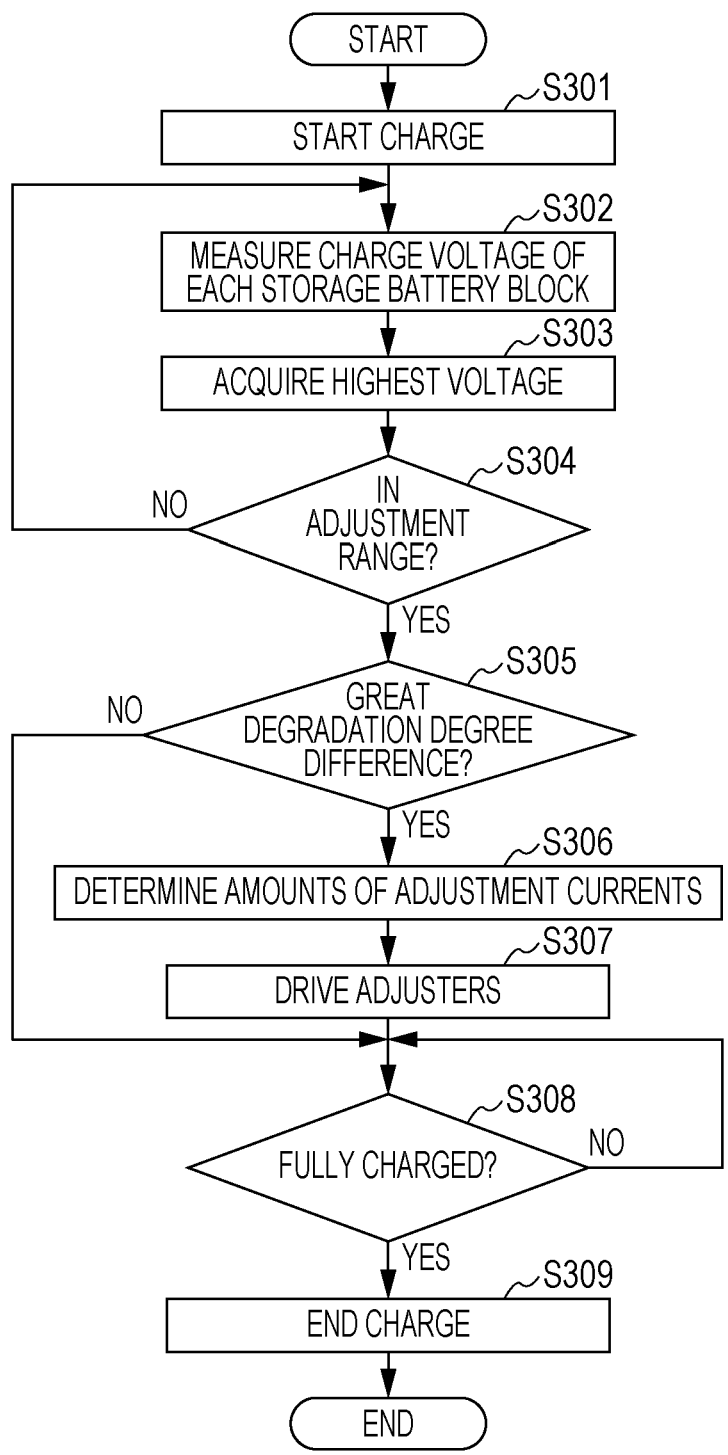
FIG. 16 is a flowchart showing the operation of the power storage device of the second embodiment during a charge.

FIG. 16 is a flowchart showing the operation of the power storage device 200 shown in FIG. 4 during a charge. In this example, first, the controller 280 starts to charge the storage battery modules 211, 212, and 213 (S301).

The controller 280 then measures the charge voltages of the storage battery blocks of each of the storage battery modules 211, 212, and 213 using the detectors 231, 232, and 233 or the like (S302). The controller 280 then acquires the charge voltages of the respective storage battery blocks having the highest charge voltage of the storage battery modules 211, 212, and 213 (S303).

The controller 280 then determines whether the respective highest charge voltages of the storage battery modules 211, 212, and 213 are in the adjustment range (S304). If the highest charge voltages are not in the adjustment range (No in S304), the controller 280 repeats the measurement of the charge voltages (S302) and later steps. If the highest charge voltages are in the adjustment range (YES in S304), the controller 280 determines whether there is a great difference in the degree of degradation among the storage battery modules 211, 212, and 213 (S305).

Specifically, the controller 280 acquires the degrees of degradation of the respective most highly degraded storage battery blocks of the storage battery modules 211, 212, and 213. The controller 280 then determines whether the differences among the highest degrees of degradation acquired from the storage battery modules 211, 212, and 213 are greater than a predetermined value.

If the differences are not greater than the predetermined value (NO in S305), the controller 280 continues the charge as usual. On the other hand, if there is a great difference in the degree of degradation (YES in S305), the controller 280 determines the amounts of adjustment currents (S306). For example, if there is a greater difference, the controller 280 increases the amounts of the bypassing currents. The controller 280 then drives the adjusters 261, 262, and 263 and controls the adjusters 261, 262, and 263 so that the adjustment currents in the determined amounts flow (S307).

At this time, the controller 280 determines the amounts of adjustment currents in such a manner that a storage battery module having the highest degree of degradation, of the storage battery modules 211, 212, and 213 does not reach a full charge, and then controls the adjusters 261, 262, and 263 so that the adjustment currents in the determined amounts flow. In this case, the storage battery module having the highest degree of degradation is a storage battery module including a most highly degraded storage battery block, of the storage battery modules 211, 212, and 213.

The controller 280 then determines whether one of the storage battery modules 211, 212, and 213 has reached a full charge, using the detectors 231, 232, and 233 or the like (S308). The controller 280 continues the charge until one of the storage battery modules 211, 212, and 213 reaches a full charge. When one of the storage battery modules 211, 212, and 213 reaches a full charge, the controller 280 ends the charge (S309).

For example, the controller 280 adjusts the amounts of the currents flowing through the adjusters 261, 262, and 263 so that a storage battery module having the lowest degree of degradation of the storage battery modules 211, 212, and 213 reaches a full charge first. The degrees of degradation of the storage battery modules 211, 212, and 213 correspond to the degrees of degradation of the respective most highly degraded storage battery blocks of the respective storage battery modules.

Figure 17:
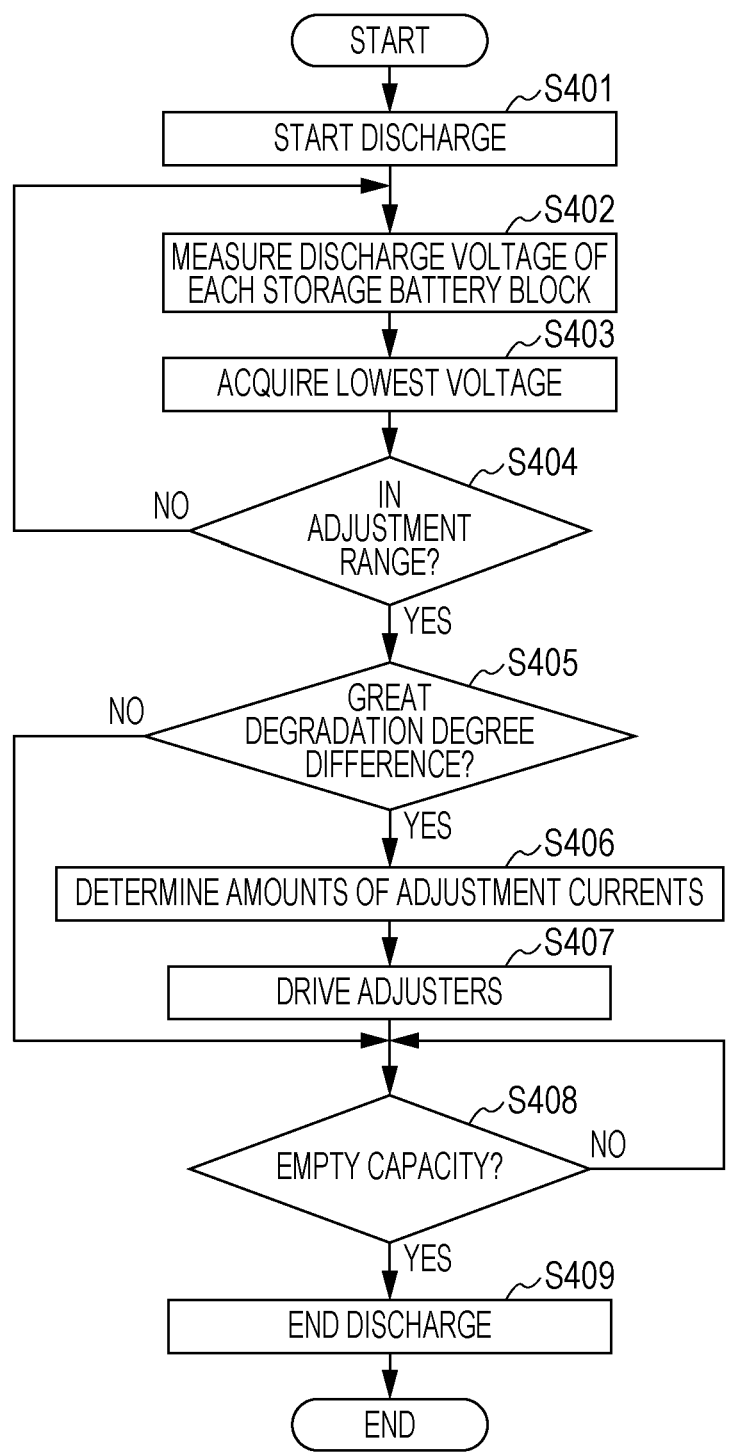
FIG. 17 is a flowchart showing the operation of the power storage device of the second embodiment during a discharge.

FIG. 17 is a flowchart showing the operation of the power storage device 200 shown in FIG. 4 during a discharge. In this example, first, the controller 280 starts a discharge of the storage battery modules 211, 212, and 213 (S401).

The controller 280 then measures the discharge voltages of the storage battery blocks of each of the storage battery modules 211, 212, and 213 using the detectors 231, 232, and 233 or the like (S402). The controller 280 then acquires the discharge voltages of the respective storage battery blocks having the lowest discharge voltage of the storage battery modules 211, 212, and 213 (S403).

The controller 280 then determines whether the lowest discharge voltages of the storage battery modules 211, 212, and 213 are in the adjustment range (S404). If the lowest discharge voltages are not in the adjustment range (No in S404), the controller 280 repeats the measurement of the discharge voltages (S402) and later steps. If the lowest discharge voltages are in the adjustment range (YES in S404), the controller 280 determines whether there is a great difference in the degree of degradation among the storage battery modules 211, 212, and 213 (S405).

Specifically, the controller 280 acquires the degrees of degradation of the respective most highly degraded storage battery blocks of the storage battery modules 211, 212, and 213. The controller 280 then determines whether the differences among the highest degrees of degradation acquired from the storage battery modules 211, 212, and 213 are greater than a predetermined value.

If there is no great difference (NO in S405), the controller 280 continues the discharge as usual. On the other hand, if there is a great difference (YES in S405), the controller 280 determines the amounts of adjustment currents (S406). For example, if there is a greater difference, the controller 280 increases the amounts of bypassing currents. The controller 280 then drives the adjusters 261, 262, and 263 and controls the adjusters 261, 262, and 263 so that the adjustment currents in the determined amounts flow (S407).

At this time, the controller 280 determines the amounts of adjustment currents in such a manner that a storage battery module having the highest degree of degradation, of the storage battery modules 211, 212, and 213 does not reach an empty capacity, and then controls the adjusters 261, 262, and 263 so that the adjustment currents in the determined amounts flow. In this case, the storage battery module having the highest degree of degradation is a storage battery module including a most highly degraded storage battery block, of the storage battery modules 211, 212, and 213.

The controller 280 then determines whether one of the storage battery modules 211, 212, and 213 has reached an empty capacity, using the detectors 231, 232, and 233 or the like (S408). The controller 280 continues the discharge until one of the storage battery modules 211, 212, and 213 reaches an empty capacity. When one of the storage battery modules 211, 212, and 213 reaches an empty capacity, the controller 280 ends the discharge (S409).

For example, the controller 280 adjusts the amounts of the currents flowing through the adjusters 261, 262, and 263 so that a storage battery module having the lowest degree of degradation, of the storage battery modules 211, 212, and 213 reaches an empty capacity first. The degrees of degradation of the storage battery modules 211, 212, and 213 correspond to the degrees of degradation of the most highly degraded storage battery blocks of the respective storage battery modules.

Figure 18:
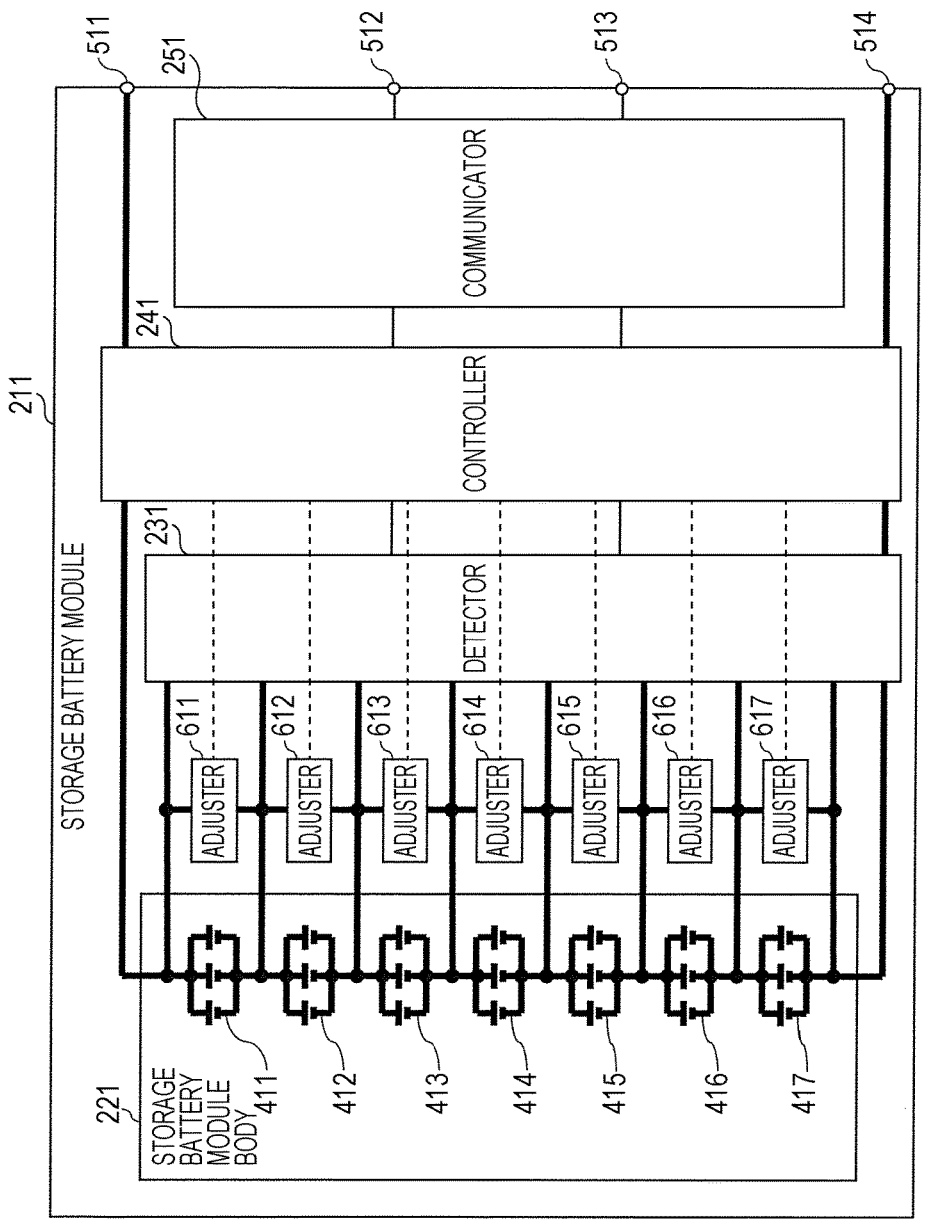
FIG. 18 is a block diagram showing another example of the configuration of the storage battery module of the second embodiment.

FIG. 18 is a block diagram showing another example of the configuration of the storage battery module 211 shown in FIGS. 4 and 10. Specifically, in the example shown in FIG. 18, the storage battery module 211 additionally includes adjusters 611 to 617 compared to that shown in FIG. 10.

While the adjusters 261, 262, and 263 are disposed in parallel with the storage battery modules 211, 212, and 213 in FIG. 4, the adjusters 611 to 617 are disposed in parallel with the storage battery blocks 411 to 417 in FIG. 18. The adjusters 611 to 617 may be disposed in place of or in addition to the adjusters 261, 262, and 263 shown in FIG. 4.

The storage battery module 211 shown in FIG. 18 may correspond to the power storage system 100 of the first embodiment. The storage battery blocks 411 to 417 may correspond to the storage battery units 121, 122, and 123 of the first embodiment. The adjusters 611 to 617 may correspond to the adjusters 141, 142, and 143 of the first embodiment. The controller 241 may correspond to the controller 150 of the first embodiment.

A path passing through the storage battery blocks 411 to 417 may correspond to the first circuit 110 of the first embodiment. A path passing through the adjuster 611, a path passing through the adjuster 612, a path passing through the adjuster 613, a path passing through the adjuster 614, a path passing through the adjuster 615, a path passing through the adjuster 616, and a path passing through the adjuster 617 may correspond to the second circuits 131, 132, and 133 of the first embodiment.

For example, the controller 241 of the storage battery module 211 operates as does the power storage device 200 of the controller 280, and the adjusters 611 to 617 to 617 operate as do the adjusters 261, 262, and 263 of the power storage device 200. Thus, in place of or in addition to the control of the storage battery modules 211, 212, and 213, the storage battery blocks 411 to 417 are controlled as are the storage battery modules 211, 212, and 213.

More specifically, the storage battery blocks 411 to 417 to 417 are controlled so that a storage battery block having a lower degree of degradation, of the storage battery blocks 411 to 417 reaches a full charge voltage or empty capacity voltage ahead of a storage battery block having a higher degree of degradation. This results in the suppression of the degradation of a storage battery block having a higher degree of degradation, of the storage battery blocks 411 to 417 and thus the suppression of local degradation.

The storage battery modules 212 and 213 may include elements equivalent to those of the storage battery module 211 shown in FIG. 18. This results in the suppression of the local degradation of each of the storage battery modules 211, 212, and 213 and thus the extension of the life of each of the storage battery modules 211, 212, and 213.

Figure 19:
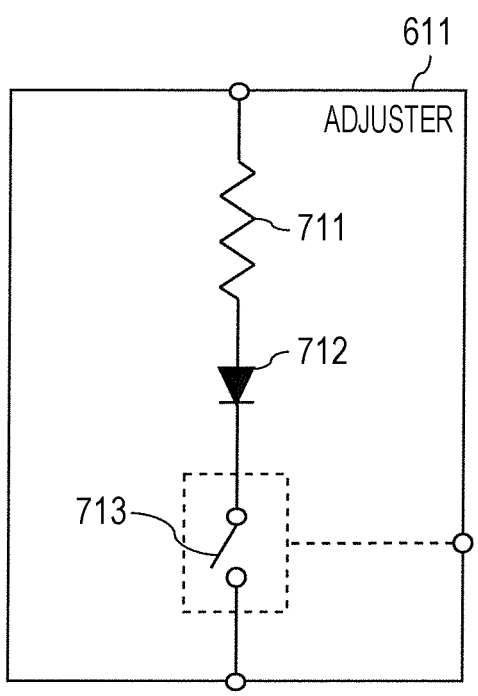
FIG. 19 is a schematic diagram showing the configuration of an adjuster included in the storage battery module of the second embodiment.

FIG. 19 is a schematic diagram showing the configuration of the adjuster 611 included in the storage battery module 211 shown in FIG. 18. The adjuster 611 shown in FIG. 19 includes a resistor 711, a diode 712, and a switch 713. These elements are equivalent to the resistor 311, diode 312, and switch 313 shown in FIG. 5. That is, the adjuster 611 may include elements equivalent to those of the adjuster 261.

While the adjuster 611 shown in FIG. 19 includes the elements equivalent to those of the adjuster 261 shown in FIG. 5, the adjuster 611 may include elements equivalent to those of the adjuster 261 shown in FIG. 8. The adjusters 612 to 617 may also include elements equivalent to those of the adjuster 611.

The degradation of a storage battery will be described below with reference to FIGS. 20 to 22. While the degradation of a storage battery is described for the sake of convenience, the description also applies to the degradation of the storage battery blocks 411 to 417 and the storage battery modules 211, 212, and 213.

Figure 20:
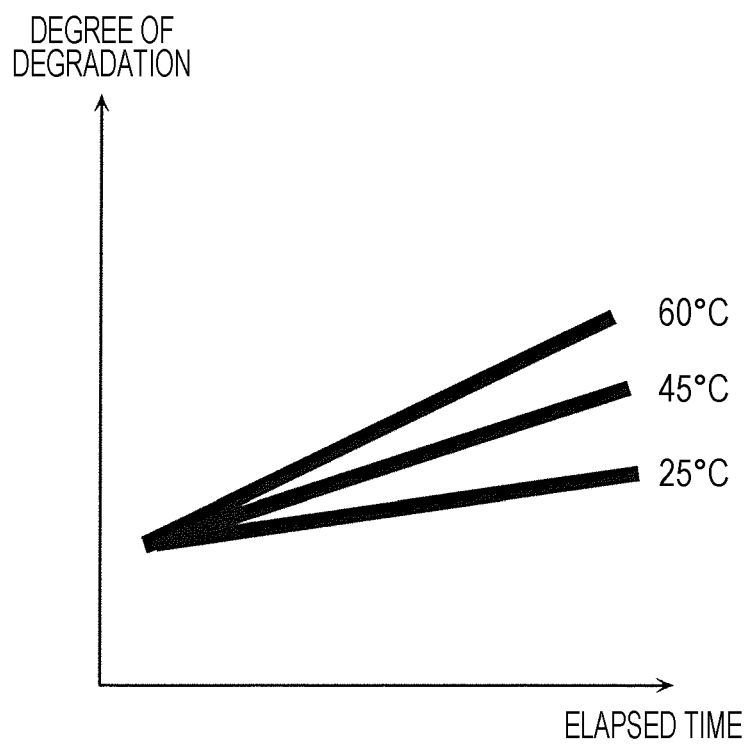
FIG. 20 is a diagram showing the relationship between the degree of degradation of a storage battery of the second embodiment and the elapsed time.

FIG. 20 is a diagram showing the relationship between the degree of degradation of a storage battery shown in FIG. 10 and the elapsed time. Temperature values shown in FIG. 20 correspond to temperature values around the storage battery. As shown in FIG. 20, the storage battery degrades with the lapse of time. Also, the storage battery degrades faster as the temperature increases.

Figure 21:
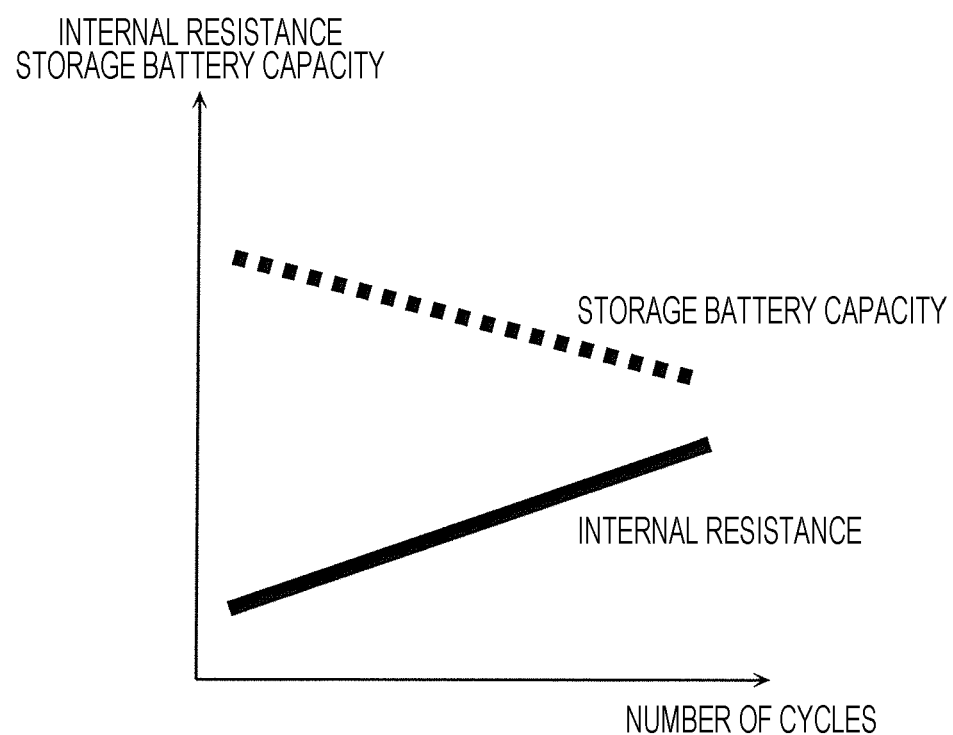
FIG. 21 is a diagram showing the relationships between the number of cycles and the internal resistance and the like of the storage battery of the second embodiment.

FIG. 21 is a diagram showing the relationship between the number of cycles and the internal resistance and the like of the storage battery shown in FIG. 10. As shown in FIG. 21, the internal resistance of the storage battery increases as the number of charge/discharge cycles increases. Also, the storage battery capacity corresponding to the full charge capacity decreases as the number of charge/discharge cycles increases. That is, the degree of degradation increases as the number of charge/discharge cycles increases.

Figure 22:
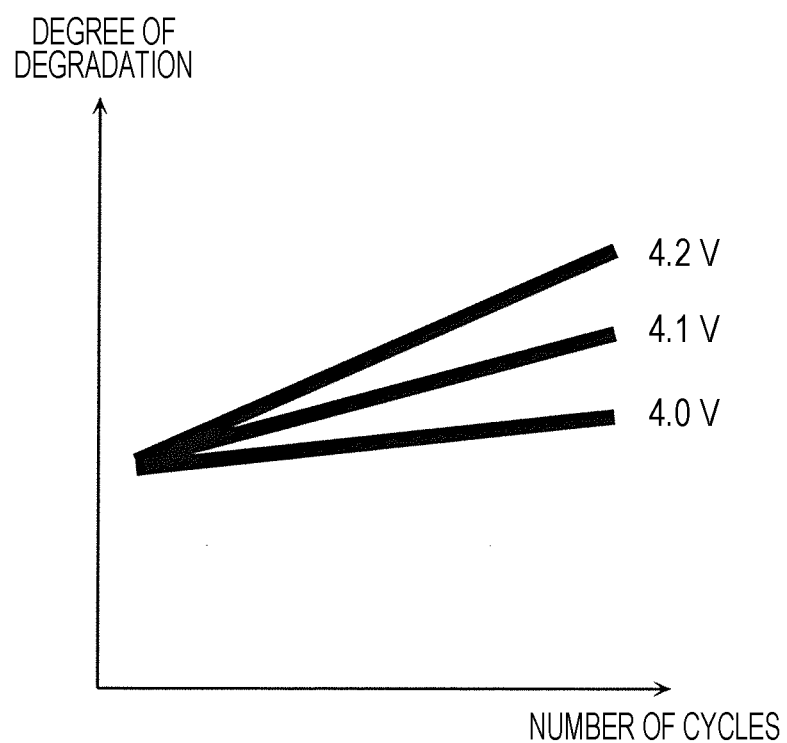
FIG. 22 is a diagram showing the relationship between the number of cycles and the charge voltage of the storage battery of the second embodiment.

FIG. 22 is a diagram showing the relationship between the number of cycles and the charge voltage of the storage battery shown in FIG. 10. Voltage values shown in FIG. 22 correspond to charge voltage values of the storage battery. As shown in FIG. 22, the storage battery degrades as the number of charge/discharge cycles increases. Also, the storage battery degrades faster as the charge voltage increases. For a discharge, the storage battery degrades faster as the discharge voltage decreases.

For example, assuming that multiple storage batteries have uniform performance, the degree of degradation varies among the storage batteries due to the variations in the temperature of the storage batteries, as shown in FIG. 20. An increase in the degree of degradation increases the internal resistance and thus the charge voltage.

For this reason, unless adjustments are made, a storage battery having a higher degree of degradation reaches a full charge ahead of a storage battery having a lower degree of degradation. Also, the storage battery having the higher degree of degradation is charged with the charge voltage thereof higher than that of the storage battery having the lower degree of degradation. The storage battery having the higher degree of degradation further degrades due to this charge voltage.

On the other hand, the charge of the storage battery having the lower degree of degradation is ended with the charge voltage thereof being low. Accordingly, the storage battery having the lower degree of degradation is less likely to degrade. For this reason, unless adjustments are made, the difference in the degree of degradation between the storage battery having the higher degree of degradation and the storage battery having the lower degree of degradation tends to expand. The same holds for a discharge. Unless adjustments are made, the difference in the degree of degradation between the storage battery having the higher degree of degradation and the storage battery having the lower degree of degradation tends to expand.

In the present embodiment, the storage battery having the higher degree of degradation is controlled so that the charge voltage thereof is reduced. Also, the storage battery having the higher degree of degradation is controlled so that the discharge voltage thereof is increased. Also, an increase in the number of charge/discharge cycles is suppressed with respect to the storage battery having the higher degree of degradation. Thus, the degradation of the storage battery having the higher degree of degradation is suppressed.

Figure 23:
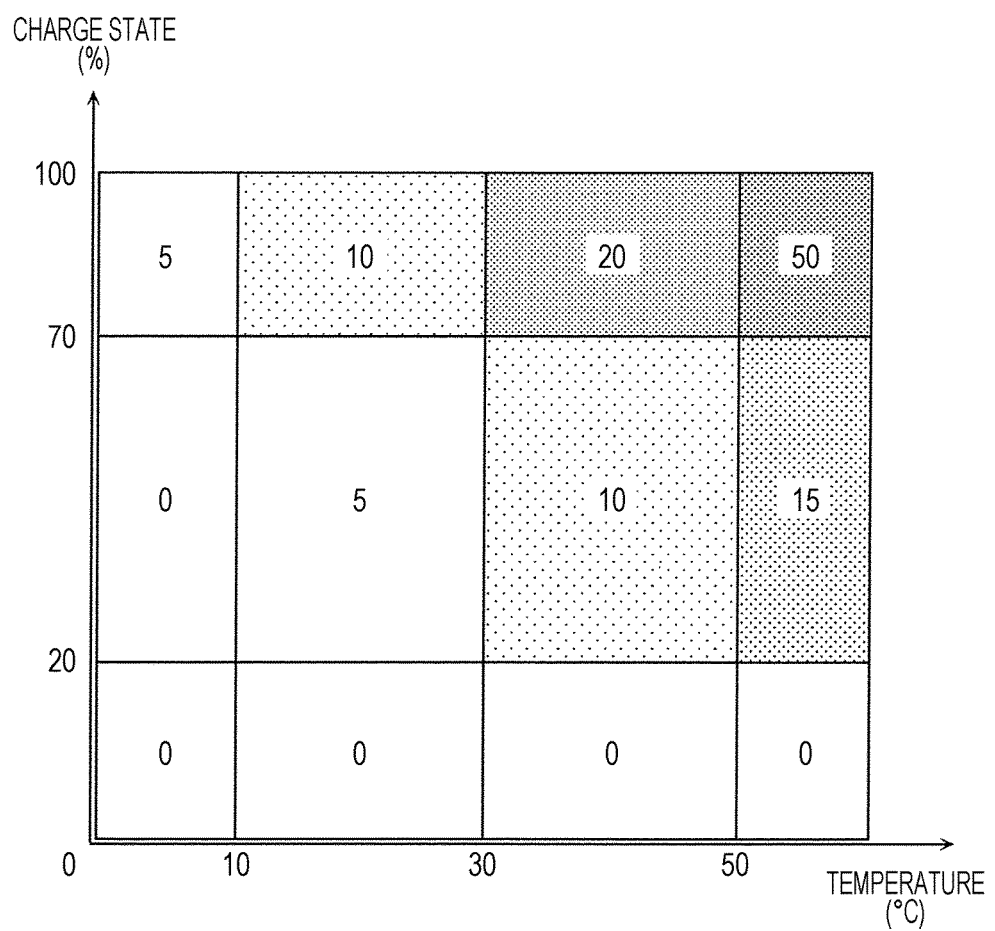
FIG. 23 is a diagram showing the relationships among the charge state, temperature, and degradation coefficient of the storage battery of the second embodiment.

FIG. 23 is a diagram showing the relationships among the charge state, temperature, and degradation coefficient of the storage battery shown in FIG. 10. The charge state shown in FIG. 23 is called state of charge (SOC) and shows the ratio of the remaining capacity to the full charge capacity. The temperature shown in FIG. 23 corresponds to the temperature of the storage battery. The degradation coefficient in FIG. 23 corresponds to the speed of degradation. Specifically, when the storage battery has a greater degradation coefficient, the storage battery degrades more easily and faster.

As shown in FIG. 23, when the charge state of the storage battery is higher, the storage battery degrades more easily. Also, when the temperature of the storage battery is higher, the storage battery degrades more easily. For example, the power storage device 200 of the present embodiment reduces the charge state using the adjusters 261, 262, and 263 before the temperature of the storage battery becomes a predetermined temperature or more and thus can suppress degradation.

As described above the power storage device 200 of the present embodiment can appropriately control the charge/discharge of the storage battery modules 211, 212, and 213 by using the adjusters 261, 262, and 263. Thus, the power storage device 200 can extend the life of the entire storage battery modules 211, 212, and 213.

The amounts of the currents flowing through the adjusters 261, 262, and 263 correspond to the degrees of degradation. Accordingly, the power storage device 200 may issue a notification to urge the exchange among the storage battery modules 211, 212, and 213 in accordance with the amounts of the currents flowing through the adjusters 261, 262, and 263. The notification may be transmitted, or may be outputted to the screen or the like of the power storage device 200.

For example, it is conceivable that if the difference between the amount of the current flowing through the adjuster 261 and the amount of the current flowing through the adjuster 262 is equal to or greater than a predetermined value, there is a great difference between the degrees of degradation of the storage battery module 211 and storage battery module 212. In this case, the power storage device 200 may issue a notification to urge the exchange between the storage battery module 211 and the storage battery module 212.

Owing to the exchange between the storage battery module 211 and storage battery module 212, the degrees of the degradation based on the layout are equalized. This results in the suppression of the local degradation of the storage battery modules 211, 212, and 213 and thus the extension of the life of the entire storage battery modules 211, 212, and 213.

In a configuration in which a greater amount of adjustment current flows when the degree of degradation is lower, as shown in FIG. 7, the power storage device 200 may check the degrees of degradation periodically and change the amounts of adjustment currents in accordance with the difference with the maximum degree of degradation. For example, when the storage battery module 212 is a most highly degraded storage battery module, the power storage device 200 may change the amount of the adjustment current flowing through the adjuster 261 in accordance with the difference in the degree of degradation between the storage battery module 212 and storage battery module 211.

In discarding the storage battery modules 211, 212, and 213, the power storage device 200 may perform a discharge using the second circuits passing through the adjusters 261, 262, and 263 until all the storage battery modules 211, 212, and 213 reach an empty capacity. At this time, the discharged power may be consumed by the adjusters 261, 262, and 263. Thus, the storage battery modules 211, 212, and 213 can be discarded appropriately.

Similarly, in discarding the storage battery module 211, the power storage device 200 may perform a discharge using the second circuits passing through the adjusters 611 to 617 until all the storage battery blocks 411 to 417 reach an empty capacity. Thus, the storage battery module 211 can be discarded appropriately.

When the charge state is higher than a predetermined value and the temperature is higher than a predetermined value, the power storage device 200 may discharge the storage battery modules 211, 212, and 213 using the second circuits passing through the adjusters 261, 262, and 263. At this time, the discharged power may be consumed by the adjusters 261, 262, and 263. Thus, the charge state is reduced, and the degradation is suppressed.

The power storage device 200 may automatically detect a high charge state and a high temperature using the detectors 231, 232, and 233 and then perform a discharge, or may perform a discharge in accordance with an instruction from outside. This operation can also be applied to the storage battery blocks 411 to 417 using the adjusters 611 to 617.

As described above, multiple storage battery units are appropriately controlled by the power storage system and the like of the present disclosure.

The elements in the above embodiments may be implemented by dedicated hardware or may be implemented by executing a software program which is suitable for the elements. The elements may also be implemented by causing a program execution unit, such as a CPU or processor, to read and execute a software program recorded in a recording medium, such as a hard disk or semiconductor memory. Examples of software for implementing the power storage system and the like of the above embodiments include the following program.

That is, this program causes a computer to perform a power storage system control method including performing at least one of first control and second control. The first control includes (a) during a charge of multiple storage battery units connected in series, making a voltage of a first storage battery unit of the storage battery units higher than a voltage of a second storage battery unit of the storage battery units by adjusting the amounts of currents flowing through circuits disposed in parallel with the storage battery units, the second storage battery unit having a higher degree of degradation than the degree of degradation of the first storage battery unit, and (b) then stopping the charge of the storage battery units with the voltage of the first storage battery unit higher than the voltage of the second storage battery unit. The second control includes (c) during a discharge of the storage battery units, making the voltage of the first storage battery unit lower than the voltage of the second storage battery unit by adjusting the amounts of the currents flowing through the circuits disposed in parallel with the storage battery units and (d) then stopping the discharge of the storage battery units with the voltage of the first storage battery unit lower than the voltage of the second storage battery unit. If the controller performs the first control and the second control, the controller performs the first control and the second control in different times. For example, the controller performs the first control before or after the second control.

In the embodiments, the elements may be circuits. Multiple elements as a whole may form a single circuit or may form separate circuits. The circuits may be general-purpose circuits or may be dedicated circuits.

While the power storage system according to one or more aspects has been described based on the embodiments, the present disclosure is not limited to the embodiments. Various modifications of the embodiments conceived of by those skilled in the art or forms constructed by combining the elements of the different embodiments can also fall within the one or more aspects without departing from the spirit and scope of the present disclosure.

For example, a process performed by a particular element in the embodiments may be performed by another element in place of the particular element. The order of multiple processes may be changed, or multiple processes may be performed in parallel.

The present disclosure can be used as a power storage system that controls multiple storage battery units, as well as can be applied to power supplies, electric devices including a power supply, and the like.

What is claimed is:

1. A system comprising:
   a first circuit in which storage battery units are connected in series;
   second circuits connected in parallel with the storage battery units;
   adjusters that adjust the amounts of the currents flowing through the second circuits; and
   a controller that performs at least one of first control and second control, the first control being control in which during a charge of the storage battery units through the first circuit, the controller causes the adjusters to make a voltage of a first storage battery unit of the storage battery units higher than a voltage of a second storage battery unit of the storage battery units by adjusting the amounts of the currents flowing through the second circuits, the second storage battery unit having a higher degree of degradation than the degree of degradation of the first storage battery unit, and then stops the charge, the second control being control in which during a discharge of the storage battery units through the first circuit, the controller causes the adjusters to make the voltage of the first storage battery unit lower than the voltage of the second storage battery unit by adjusting the amounts of the currents flowing through the second circuits, and then stops the discharge.

2. The system according to claim 1, wherein
   the second circuits are circuits through which currents bypassing the storage battery units flow during the charge of the storage battery units through the first circuit, and
   in the first control, the controller causes the adjusters to make the voltage of the first storage battery unit higher than the voltage of the second storage battery unit by making the current flowing through the second circuit connected in parallel with the first storage battery unit smaller than the current flowing through the second circuit connected in parallel with the second storage battery unit, and then stops the charge.

3. The system according to claim 1, wherein
   the second circuits are circuits through which discharge currents of the storage battery units flow during the charge of the storage battery units through the first circuit, and
   in the first control, the controller causes the adjusters to make the voltage of the first storage battery unit higher than the voltage of the second storage battery unit by making the current flowing through the second circuit disposed in parallel with the first storage battery unit smaller than the current flowing through the second circuit disposed in parallel with the second storage battery unit, and then stops the charge.

4. The system according to claim 3, wherein at least either before starting the charge of the storage battery units through the first circuit or during a suspension of the charge, the controller causes the adjusters to make the voltage of the first storage battery unit higher than the voltage of the second storage battery unit by making the current flowing through the second circuit connected in parallel with the first storage battery unit lower than the current flowing through the second circuit connected in parallel with the second storage battery unit.

5. The system according to claim 1, wherein
the second circuits are circuits through which currents bypassing the storage battery units flow during the discharge of the storage battery units through the first circuit, and
in the second control, the controller causes the adjusters to make the voltage of the first storage battery unit lower than the voltage of the second storage battery unit by making the current flowing through the second circuit disposed in parallel with the first storage battery unit smaller than the current flowing through the second circuit disposed in parallel with the second storage battery unit, and then stops the discharge.

6. The system according to claim 1, wherein
the second circuits are circuits through which discharge currents of the storage battery units flow during the discharge of the storage battery units through the first circuit, and
in the second control, the controller causes the adjusters to make the voltage of the first storage battery unit lower than the voltage of the second storage battery unit by making the current flowing through the second circuit connected in parallel with the first storage battery unit greater than the current flowing through the second circuit connected in parallel with the second storage battery unit, and then stops the discharge.

7. The system according to claim 6, wherein at least either before starting the discharge of the storage battery units through the first circuit or during a suspension of the discharge, the controller causes the adjusters to make the voltage of the first storage battery unit higher than the voltage of the second storage battery unit by making the current flowing through the second circuit connected in parallel with the first storage battery unit greater than the current flowing through the second circuit connected in parallel with the second storage battery unit.

8. The system according to claim 1, wherein in the first control, the controller raises the voltage of the first storage battery unit to a charge end voltage, raises the voltage of the second storage battery unit to a lower voltage than the charge end voltage, and then stops the charge.

9. The system according to claim 1, wherein in the second control, the controller lowers the voltage of the first storage battery unit to a discharge end voltage, lowers the voltage of the second storage battery unit to a higher voltage than the discharge end voltage, and then stops the discharge.

10. The system according to claim 1, wherein during the charge of the storage battery units through the first circuit, the controller performs the charge of the storage battery units through the first circuit without performing the first control and then performs the first control.

11. The system according to claim 1, wherein during the discharge of the storage battery units through the first circuit, the controller performs the discharge of the storage battery units through the first circuit without performing the second control and then performs the second control.

12. The system according to claim 1, wherein the first storage battery unit is a storage battery unit having the lowest degree of degradation, of the storage battery units.

13. The system according to claim 1, wherein the second storage battery unit is a storage battery unit having the highest degree of degradation, of the storage battery units.

14. The system according to claim 1, wherein
the storage battery units each comprise storage batteries, and
the first storage battery unit is a storage battery unit comprising a storage battery having the lowest degree of degradation in a group of respective storage batteries having the highest degree of degradation of the storage battery units.

15. The system according to claim 1, wherein
the storage battery units each comprise storage batteries, and
the second storage battery unit is a storage battery unit comprising a storage battery having the highest degree of degradation in a group of respective storage batteries having the highest degree of degradation of the storage battery units.

16. The system according to claim 1, further comprising detectors that detect the quantities of state of the storage battery units, wherein
the controller causes the adjusters to stop the currents flowing through the second circuits and determines the degrees of degradation of the storage battery units from the quantities of state detected by the detectors while stopping the currents flowing through the second circuits.

17. A method comprising performing at least one of first control and second control, wherein
the first control comprises:
(a) during a charge of storage battery units connected in series, making a voltage of a first storage battery unit of the storage battery units higher than a voltage of a second storage battery unit of the storage battery units by adjusting the amounts of currents flowing through circuits connected in parallel with the storage battery units, the second storage battery unit having a higher degree of degradation than the degree of degradation of the first storage battery unit, and
(b) then stopping the charge of the storage battery units with the voltage of the first storage battery unit higher than the voltage of the second storage battery unit, and
the second control comprises:
(c) during a discharge of the storage battery units, making the voltage of the first storage battery unit lower than the voltage of the second storage battery unit by adjusting the amounts of the currents flowing through the circuits connected in parallel with the storage battery units, and
(d) then stopping the discharge of the storage battery units with the voltage of the first storage battery unit lower than the voltage of the second storage battery unit.

* * * * *